(12) United States Patent
Marcoe et al.

(10) Patent No.: US 11,541,579 B2
(45) Date of Patent: Jan. 3, 2023

(54) METHOD AND APPARATUS FOR FORMING A COMPOSITE FUSELAGE STRUCTURE

(71) Applicant: The Boeing Company, Chicago, IL (US)

(72) Inventors: Jeffery Lee Marcoe, Bellevue, WA (US); Marc R. Matsen, Tukwila, WA (US)

(73) Assignee: The Boeing Company, Chicago, IL (US)

( * ) Notice: Subject to any disclaimer, the term of this patent is extended or adjusted under 35 U.S.C. 154(b) by 152 days.

(21) Appl. No.: 16/718,775

(22) Filed: Dec. 18, 2019

(65) Prior Publication Data
US 2021/0187796 A1 Jun. 24, 2021

(51) Int. Cl.
| | |
|---|---|
| B29C 35/00 | (2006.01) |
| B32B 1/00 | (2006.01) |
| B64C 1/00 | (2006.01) |
| B29C 35/08 | (2006.01) |
| B64C 1/06 | (2006.01) |
| B32B 1/08 | (2006.01) |
| B29K 101/12 | (2006.01) |

(52) U.S. Cl.
CPC ............ B29C 35/0805 (2013.01); B32B 1/08 (2013.01); B64C 1/064 (2013.01); B29C 2035/0811 (2013.01); B29K 2101/12 (2013.01); B32B 2605/18 (2013.01)

(58) Field of Classification Search
CPC ..... B29C 35/00; B29C 35/08; B29C 35/0805; B32B 1/00; B32B 1/08; B64C 1/00; B64C 1/06; B64C 1/064
See application file for complete search history.

(56) References Cited

U.S. PATENT DOCUMENTS

| | | | |
|---|---|---|---|
| 8,770,081 | B2 | 7/2014 | David et al. |
| 8,844,873 | B2 | 9/2014 | Marcoe |
| 9,174,393 | B2 * | 11/2015 | Bartel .................. B29C 70/462 |
| 10,016,947 | B2 | 7/2018 | Matsen et al. |
| 10,029,398 | B2 | 7/2018 | Matsen et al. |
| 2013/0075529 | A1 | 3/2013 | Marcoe |
| 2015/0013883 | A1 * | 1/2015 | Matsen ............... B29C 35/0805 |
| | | | 156/379.6 |

FOREIGN PATENT DOCUMENTS

| | | |
|---|---|---|
| WO | WO 02/072337 A1 | 9/2002 |
| WO | WO 2019/020583 A1 | 1/2019 |

* cited by examiner

*Primary Examiner* — Jacob T Minskey
*Assistant Examiner* — Matthew Hoover
(74) *Attorney, Agent, or Firm* — Haynes and Boone, LLP

(57) ABSTRACT

A method and apparatus for forming a composite structure. A plurality of consolidated overbraided thermoplastic preforms are co-consolidated in a circumferential stackup that is circumferentially constrained. Fibers of the plurality of consolidated overbraided thermoplastic preforms are tensioned during co-consolidation.

26 Claims, 28 Drawing Sheets

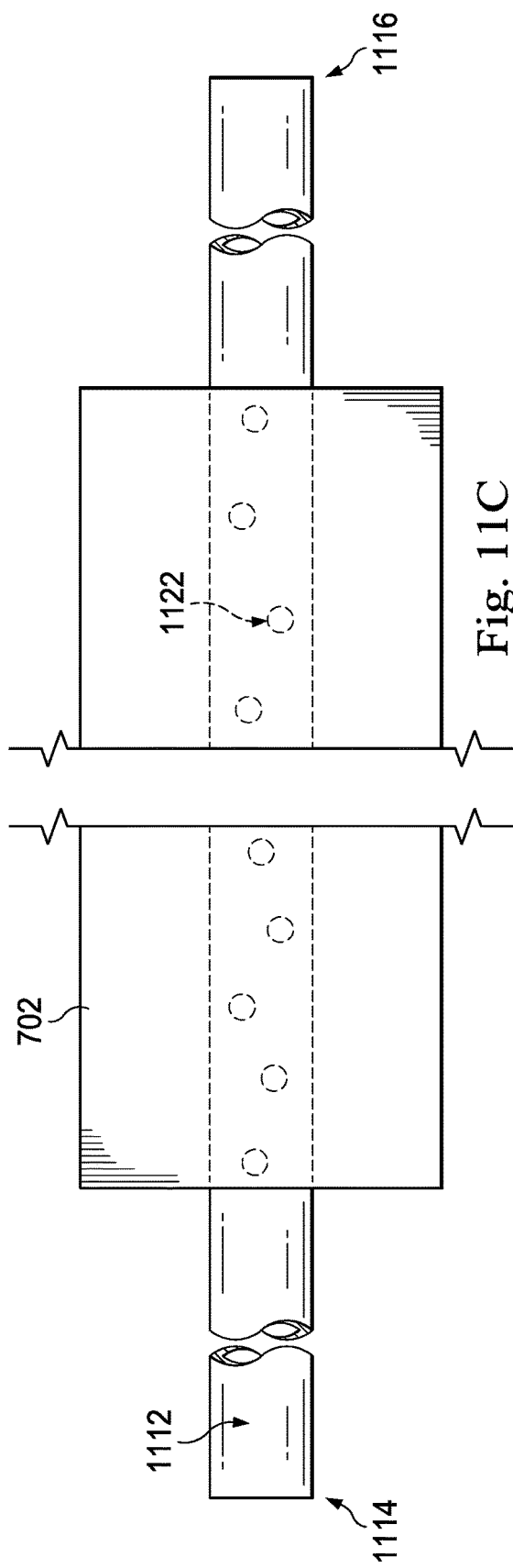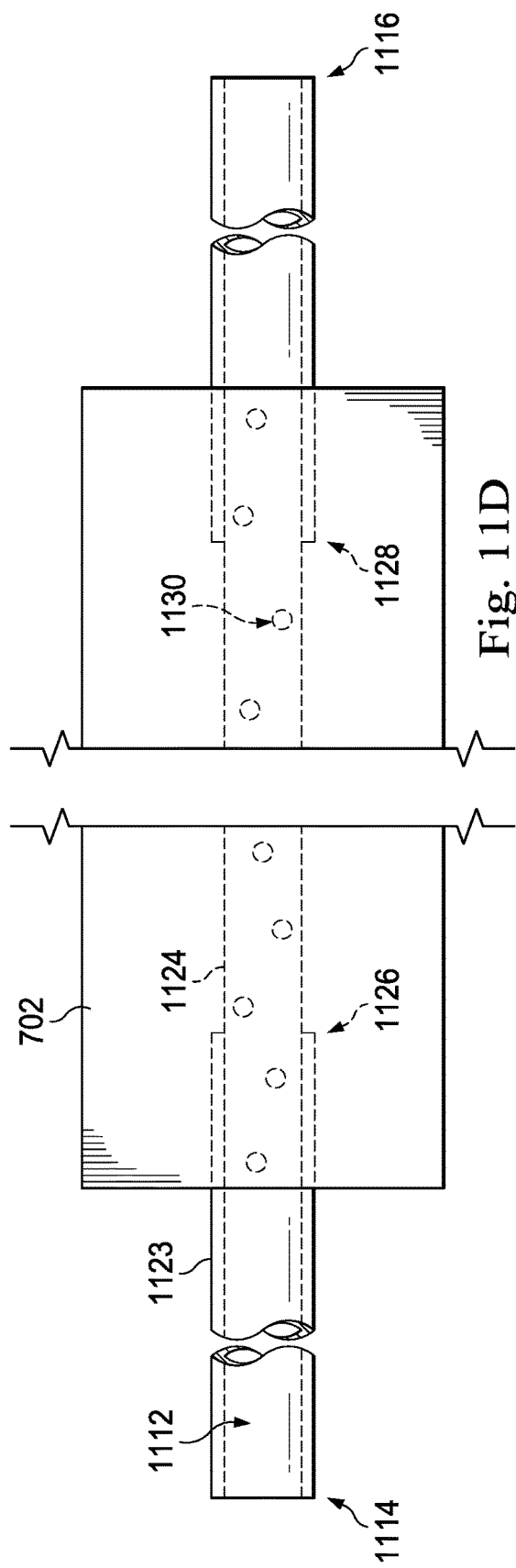

US 11,541,579 B2

METHOD AND APPARATUS FOR FORMING A COMPOSITE FUSELAGE STRUCTURE

FIELD

This disclosure generally relates to composite manufacturing and, more particularly, to methods and apparatuses for fabricating a composite fuselage structure by integrating a fuselage skin and fuselage stringers comprised of overbraided material.

BACKGROUND

Different types of aircraft structures may be fabricated using composite materials. Currently, many aircraft structures are formed using thermoset composite materials. However, using thermoset composite materials (e.g., thermoset resin) may be more challenging than desired when fabricating larger sized and shaped aircraft structures, such as fuselage barrel sections. Further, the process involved in using thermoset composite materials for such structures may be more time-consuming and costly than desired.

For example, the process of fabricating a fuselage barrel section using a thermoset composite material may involve more facility resources (e.g., facility equipment) and tooling than desired. Additionally, traditional methods involving the use of an autoclave to cure a fuselage barrel structure comprised of thermoset composite material may be slower than desired with respect to production rate requirements. Meeting such production rate requirements may require a more significant investment in capital, equipment, facility resources, or a combination thereof than desired.

Therefore, it would be desirable to have a method and apparatus that takes into account at least some of the issues discussed above, as well as other possible issues.

SUMMARY

In one illustrative example, a system comprises an inner tooling, a first smart susceptor, a stackup, a second smart susceptor, and an outer tooling. The first smart susceptor is positioned around the inner tooling. The stackup is positioned around the first smart susceptor. The stackup comprises a bladder having a plurality of recessed portions; a plurality of cauls positioned within the plurality of recessed portions; a plurality of overbraided thermoplastic members positioned over the plurality of cauls; a plurality of stringer bladders positioned in contact with the plurality of overbraided thermoplastic members; and an overbraided thermoplastic skin positioned over the plurality of stringer bladders and the plurality of overbraided thermoplastic members such that each of the plurality of stringer bladders is sandwiched between the overbraided thermoplastic skin and a corresponding one of the plurality of overbraided thermoplastic members. The second smart susceptor is positioned around the stackup. The outer tooling is positioned around the second smart susceptor.

In another illustrative example, a method is provided for forming a composite structure. A plurality of stringer bladders are expanded in a stackup to thereby apply force against a plurality of overbraided thermoplastic members and an overbraided thermoplastic skin. The stackup is constrained via a dielectric material embedded within a non-dielectric material during expansion of the plurality of stringer bladders. The non-dielectric material is constrained via the dielectric material during expansion of the plurality of stringer bladders.

In yet another illustrative example, a method is provided for forming a composite structure. A plurality of consolidated overbraided thermoplastic preforms are co-consolidated in a circumferential stackup that is circumferentially constrained. Fibers of the plurality of consolidated overbraided thermoplastic preforms are tensioned during co-consolidation.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the example embodiments are set forth in the appended claims. The example embodiments, however, as well as a preferred mode of use, further objectives and features thereof, will best be understood by reference to the following detailed description of an example embodiment of the present disclosure when read in conjunction with the accompanying drawings.

FIG. 11C is an illustration of an enlarged view of another configuration for the pressurization tube from FIG. 11A in accordance with an example embodiment.

FIG. 11D is an illustration of an enlarged view of yet another configuration for the pressurization tube from FIG. 11A in accordance with an example embodiment.

DETAILED DESCRIPTION

Figure 1:
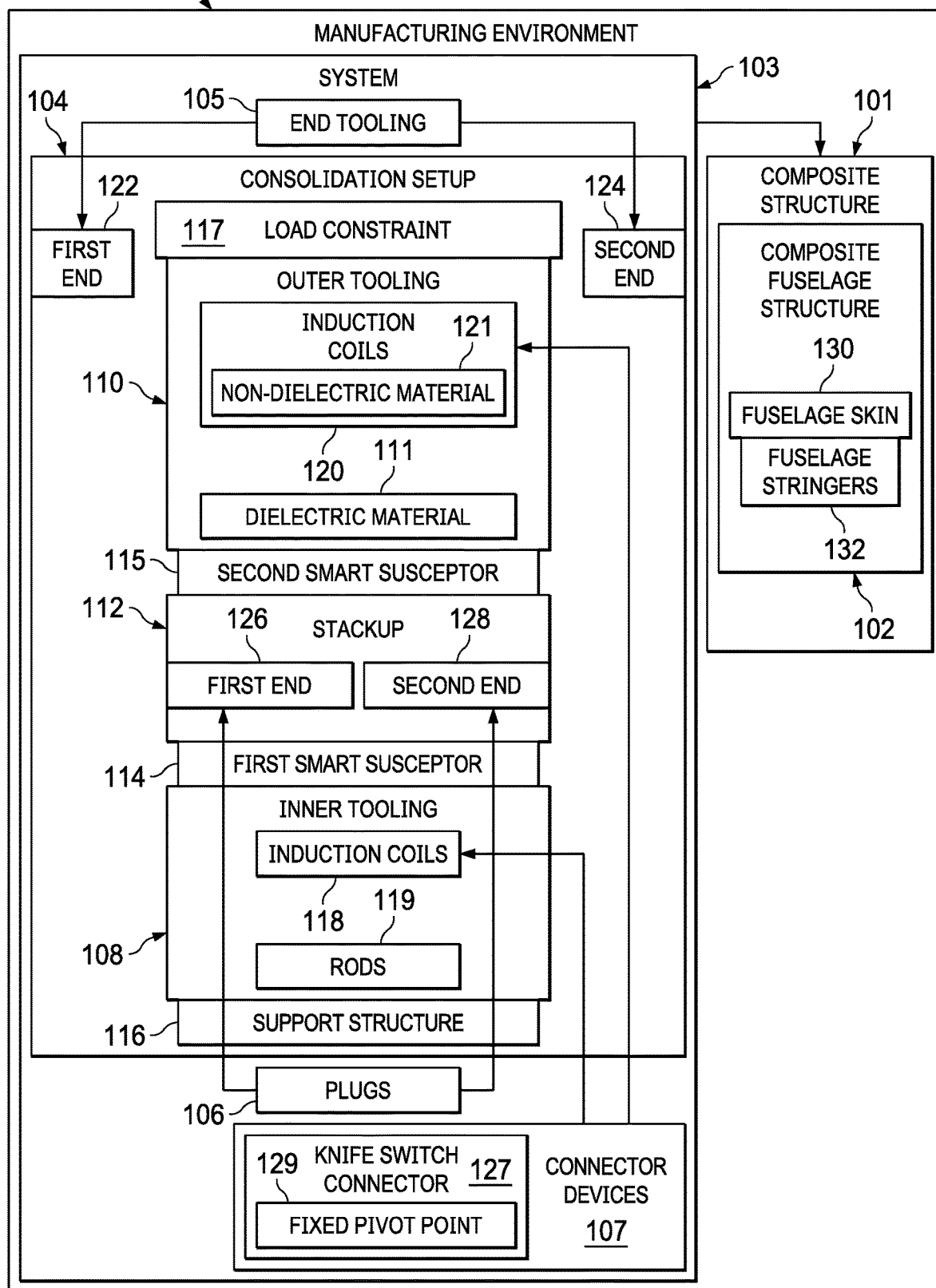
FIG. 1 is a block diagram of a manufacturing environment in accordance with an example embodiment.

The example embodiments described below provide methods, apparatuses, and systems for rapidly and efficiently fabricating composite structures such as fuselage barrel sections at reduced cost and weight. In particular, using thermoplastic materials to fabricate a composite structure such as a fuselage barrel section may help reduce overall fabrication costs and production times.

The example embodiments described methods, apparatuses, and systems that eliminate the need for autoclaves to cure fuselage barrel structures. The use of autoclaves may be more expensive than desired. Further, autoclaves have thermal mass requirements due to their size and complexity that make using autoclaves more time-consuming and less efficient than desired for fabricating fuselage barrel sections. By eliminating the need for autoclaves, the example embodiments described herein reduce the cost and time needed to fabricate fuselage barrel sections. For example, at least some of the example methods for fabricating a fuselage barrel structure described herein may take one tenth of the time that would be required when using an autoclave.

Further, using the systems described herein, less overall heating is required because thermoplastic materials are fully reacted and therefore no curing is required. The systems described herein require less overall equipment and less complex equipment for the fabrication of fuselage barrel sections as compared to those systems involving autoclaves.

The example embodiments describe creating a composite structure, such as a fuselage barrel section, using overbraided thermoplastic stringers consolidated to an overbraided thermoplastic skin. Induction heating is used to perform this consolidation in a relatively inexpensive, rapid, and reliable manner. As used herein, "consolidation" or a "consolidation process" refers to the process by which components comprised of overbraided thermoplastic material are heated to melting such that the components can be joined, fused, or integrated with each other. This heating is performed using smart susceptors that allow for fast heating to a selected temperature and then maintaining that temperature precisely. The process may further include cooling the components after this joining or integration process to result in a fully integrated structure.

Once the integrated fuselage barrel structure has been fabricated, other fuselage components may be easily welded to or otherwise attached to the fuselage barrel structure. For example, without limitation, skin tear straps, pad-ups, and local reinforcements for a door cutout and service door area may be induction-welded to the fuselage barrel structure via high rate production fiber placement and stacking placement of thermoplastic materials. Fuselage and window frames and other components (e.g., tear straps, intercostals, doublers, shear ties, systems brackets, etc.) may also be welded into place using induction welding technology.

Thus, the example embodiments described below provide methods, apparatuses, and systems for forming a composite structure using thermoplastic materials and induction heating. In one example embodiment, a stackup is built in which the stackup a plurality of overbraided thermoplastic members and an overbraided thermoplastic skin. The stackup may also include a bladder having a plurality of recessed portions, a plurality of cauls within the plurality of recessed portions, and a plurality of stringer bladders. The stackup is placed between an inner tooling and an outer tooling. A load constraint is used to hold the inner tooling, the stackup, the outer tooling in place. The consolidation setup is heated to form the composite structure. This heating, which may be performed via induction and using smart susceptors, co-consolidates the plurality of overbraided thermoplastic members with the overbraided thermoplastic skin to thereby form the composite structure.

Referring now to the figures, FIG. 1 is a block diagram of a manufacturing environment 100 in accordance with an example embodiment. Within manufacturing environment 100, composite structure 101 is formed. In these illustrative examples, composite structure 101 takes the form of composite fuselage structure 102. Composite fuselage structure 102 may be, for example, a composite barrel section. In other illustrative examples, composite structure 101 may take some other form.

Composite structure 101 is formed using system 103. System 103 includes consolidation setup 104, end tooling 105, a plurality of plugs 106, and a plurality of connector devices 107. In these illustrative examples, consolidation setup 104 includes inner tooling 108, outer tooling 110, stackup 112, first smart susceptor 114, second susceptor 115, support structure 116, and load constraint 117.

Inner tooling 108 includes a plurality of induction coils 118 embedded within inner tooling 108. In some examples, inner tooling 108 is also embedded with a plurality of rods 119. Rods 119 may take the form of, for example, without limitation, fiberglass rods. Rods 119 are used to reinforce inner tooling 108 and to load inner tooling 108 during compression.

Similar to inner tooling 108, outer tooling 110 includes a plurality of induction coils 120 embedded within outer tooling 110. Inner tooling 108 and outer tooling 110 may be comprised of a same material or different types of materials. In one illustrative example, inner tooling 108 and outer tooling 110 are both comprised of a ceramic material.

Stackup 112 is positioned between inner tooling 108 and outer tooling 110. In particular, stackup 112 is positioned between first smart susceptor 114 and second smart susceptor 115, which are located between inner tooling 108 and outer tooling 110. For example, first smart susceptor 114 is positioned between stackup 112 and inner tooling 108. Second smart susceptor 115 is positioned between stackup 112 and outer tooling 110.

In these illustrative examples, first smart susceptor 114 and second smart susceptor 115 are considered separate from inner tooling 108 and outer tooling 110, respectively. But in other illustrative examples, first smart susceptor 114 may be integrated with or otherwise considered part of inner tooling 108, and second smart susceptor 115 may be integrated with or otherwise considered part of outer tooling 110. For example, first smart susceptor 114 and second smart susceptor 115 may be considered liners for inner tooling 108 and outer tooling 110, respectively.

Both first smart susceptor 114 and second smart susceptor 115 are electrically conductive and have high thermal conductivity. Both of these smart susceptors absorb electromagnetic energy and convert such electromagnetic energy into heat. For example, induction coils 118 and induction coils 120 may generate an electromagnetic flux field. First smart susceptor 114 and second smart susceptor 115 may be positioned within the electromagnetic flux field and includes a magnetically permeable material that responds to the electromagnetic flux field to generate heat.

A "smart susceptor," such as first smart susceptor 114 or second smart susceptor 115, is typically comprised of a material or materials that generates heat efficiently until reaching a threshold temperature (i.e., a Curie temperature). As portions of the smart susceptor reach the threshold temperature, the magnetic permeability of those portions decreases. This decrease in magnetic permeability limits the generation of heat by those portions of the smart susceptor and shifts the magnetic flux to the lower-temperature portions causing these lower-temperature portions to more quickly heat up to the threshold temperature.

In this manner, first smart susceptor 114 and second smart susceptor 115 are used to help distribute heat and ensure thermal uniformity when stackup 112 is inductively heated via induction coils 118 and induction coils 120. This inductive heating is used to thermally consolidate overbraided thermoplastic components, described below in FIG. 2, within stackup 112.

Support structure 116 provides support for consolidation setup 104 and is used to hold inner tooling 108 in place. In some examples, support structure 116 is referred to as a mandrel or inner mandrel. Inner tooling 108 is positioned around support structure 116.

Load constraint 117 is positioned around outer tooling 110 and helps hold the various components of consolidation setup 104 in place. In particular, load constraint 117 helps hold inner tooling 108, first smart susceptor 114, stackup 112, second smart susceptor 115, and outer tooling 110 in place relative to each other during the formation of composite structure 101.

Consolidation setup 104 has first end 122 and second end 124. Stackup 112 within consolidation setup 104 has first end 126 and second end 128. In these illustrative examples, plugs 106 are located at first end 126 and second end 128 of stackup 112. End tooling 105 is located at first end 122 and second end 124 of consolidation setup 104 and used to support and secure plugs 106.

Connector devices 107 are used to connect induction coils 118 with induction coils 120. Connector devices 107 may be located at both first end 122 and second end 124 of consolidation setup 104. Connector devices 107 may take different forms. In one illustrative example, each of connector devices 107 takes the form of knife switch connector 127. Knife switch connector 127 may be, for example, a bar of copper or some other highly conductive material that is capable of rotating about a fixed pivot point 129.

Consolidation setup 104 is heated inductively using induction coils 118 and induction coils 120. In particular, first smart susceptor 114 and second smart susceptor 115 are heated inductively via induction coils 118 and induction coils 120. These smart susceptors help ensure thermal uniformity in stackup 112, within selected tolerances, during consolidation. In the illustrative examples in which composite fuselage structure 102 is being formed, the result of this consolidation is the integration of a plurality of fuselage stringers 130 with fuselage skin 132.

Fuselage skin 132 may be a circumferential skin in these illustrative examples. For example, fuselage skin 132 may be used to form a full fuselage barrel section. In other illustrative examples, fuselage skin 132 may be curved and formed into a half fuselage barrel section, a quarter fuselage barrel section, or some other type of partial fuselage barrel section.

Figure 2:
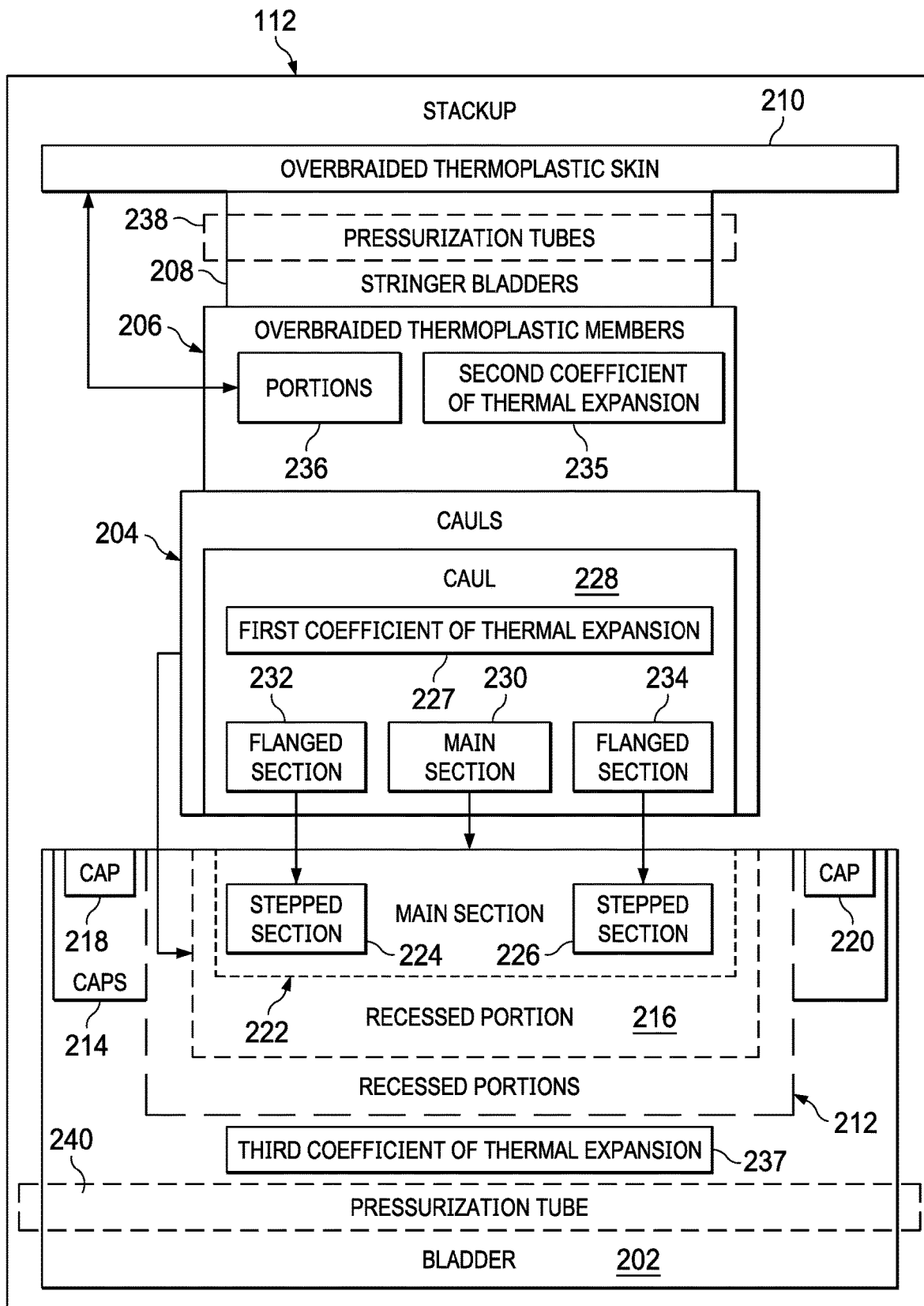
FIG. 2 is a more detailed illustration of a stackup in accordance with an example embodiment.

FIG. 2 is a more detailed illustration of stackup 112 from FIG. 1 in accordance with an example embodiment. Stackup 112 includes bladder 202, a plurality of cauls 204, a plurality of overbraided thermoplastic members 206, a plurality of stringer bladders 208, and overbraided thermoplastic skin 210. These components of stackup 112 are positioned relative to each other in a particular manner when used in system 103 to form composite structure 101.

In these illustrative examples, bladder 202 is shaped such that bladder 202 has a plurality of recessed portions 212 and a plurality of caps 214. Each of recessed portions 212 is located between two of caps 214. Recessed portion 216 is an example of one of recessed portions 212. Recessed portion 216 is located between cap 218 and cap 220 of caps 214. Recessed portion 216 includes main section 222, stepped section 224, and stepped section 226. Stepped section 224 is located at a first edge of recessed portion 216 near cap 218. Stepped section 226 is located at a second edge of recessed portion 216 near cap 220. Main section 222 extends between stepped section 224 and stepped section 226. In some examples, main section 222 includes a base section (that may form the "cap" portion of a hat stringer) and two webbed sections that extend from this base section to stepped section 224 and stepped section 226.

Bladder 202 may be comprised of a material that provides a desired level of elasticity and compliance at high temperatures. In these illustrative examples, bladder 202 may be comprised of aluminum (which may be an aluminum alloy). The aluminum provides a desired level of elasticity and compliance at higher temperatures (e.g., temperatures over about 500 degrees Fahrenheit). In one illustrative example, bladder 202 is comprised of an aluminum alloy such as 5083 aluminum alloy, which is an aluminum alloyed with magnesium and traces of manganese and chromium. In other examples, bladder 202 may be referred to as an inner mold line (IML) bladder.

Cauls 204 are positioned within recessed portions 212 of bladder 202. For example, each of cauls 204 may be positioned within a corresponding one of recessed portions 212. Cauls 204 are used to provide a stable, rigid, and smooth surface for overbraided thermoplastic members 206. Each of cauls 204 is comprised of a material selected to provide a desired level of strength to cauls 204 without requiring cauls 204 be thicker than desired. Further, each of cauls 204 is comprised of a material selected such that cauls 204 have first coefficient of thermal expansion 227.

Caul 228 is an example of one of cauls 204. Caul 228 may be positioned within recessed portion 216 when used in stackup 112. Caul 228 may be between about $1/6^{th}$ of an inch to about $1/10^{th}$ of an inch in thickness. In one illustrative example, caul 228 is about $1/8^{th}$ of an inch in thickness. Caul 228 may be comprised of a nickel-iron alloy in these illustrative examples. In one illustrative example, caul 228 is comprised of an invar alloy comprising between about 40 percent to about 43 percent nickel (e.g., Invar 42). In some illustrative examples, caul 228 may be referred to as an invar caul.

Caul 228 may be shaped to substantially conform to or match recessed portion 216 of bladder 202. For example, caul 228 may have main section 230, flanged section 232, and flanged section 234. Main section 230 substantially matches main section 222 of recessed portion 216. Thus, in some cases, main section 230 includes a base section and two webbed sections extending from the base section to flanged section 232 and flanged section 234. Flanged section 232 is shaped to fit within or sit over stepped section 224. Similarly, flanged section 234 is shaped to fit within or sit over stepped section 226.

Overbraided thermoplastic members 206 are positioned over cauls 204. In particular, each of overbraided thermoplastic members 206 is positioned relative to a corresponding one of cauls 204. Overbraided thermoplastic members 206 are shaped similarly to cauls 204. In these illustrative examples, cauls 204 and overbraided thermoplastic members 206 have thicknesses that ensure overbraided thermoplastic members 206 do not extend past the profile (e.g., circumferential profile) of bladder 202 defined by caps 214 of bladder 202.

Overbraided thermoplastic members 206 may be formed using available apparatuses and techniques for overbraiding continuous fibers of thermoplastic composite materials. Overbraiding enables a large number of spools of continuous fiber thermoplastic materials to be used at once. For example, with overbraiding, the spools may number in the hundreds, thereby enabling high rates of material application.

Overbraided thermoplastic members 206 have second coefficient of thermal expansion 235. In these illustrative examples, first coefficient of thermal expansion 227 of cauls 204 is within a desired range of second coefficient of thermal expansion 235 of overbraided thermoplastic members 206.

For example, cauls 204 may be made from a material such that first coefficient of thermal expansion 227 of cauls 204 is closer to second coefficient of thermal expansion 235 of overbraided thermoplastic members 206 as compared to third coefficient of thermal expansion 237 of bladder 202. In some cases, the material of cauls 204 may be selected such that first coefficient of thermal expansion 227 of cauls 204 is as close as possible to second coefficient of thermal expansion 235 of overbraided thermoplastic members 206.

With cauls 204 and overbraided thermoplastic members 206 having coefficients of thermal expansion that are close, cauls 204 are capable of maintaining a desired strength and rigidity during induction heating to help overbraided thermoplastic members 206 retain their smoothness and shape during induction heating. For example, the aluminum that makes up bladder 202 may have third coefficient of thermal expansion 237 that is not close to second coefficient of thermal expansion 235 of overbraided thermoplastic members 206. For example, third coefficient of thermal expansion 237 may be much lower than second coefficient of thermal expansion 235. Therefore, during induction heating, bladder 202 may soften. Without cauls 204, the softening of bladder 202 might cause undesired undulations in overbraided thermoplastic members 206. Thus, cauls 204 provide a well-defined surface for overbraided thermoplastic members 206 while reducing or eliminating the potential issues associated with the differences in coefficients of thermal expansion between bladder 202 and overbraided thermoplastic members 206.

Stringer bladders 208 are positioned over overbraided thermoplastic members 206. Stringer bladders 208 are shaped to nest within the remaining space within recessed portions 212 of bladder 202 without extending beyond the profile (e.g., circumferential profile) of bladder 202.

In these illustrative examples, stringer bladders 208 may be comprised of an aluminum (which may be an aluminum alloy). The aluminum may provide a desired level of elasticity and compliance at higher temperatures (e.g., temperatures over about 500 degrees Fahrenheit). For example, during induction heating, the aluminum may become compliant and soft such that stringer bladders 208 provide substantially even pressure over overbraided thermoplastic members 206. In other words, stringer bladders 208 comprised of aluminum help provide even pneumatic pressure to help ensure that a pressure gradient is not created. In one illustrative example, stringer bladders 208 are comprised of an aluminum alloy such as 5083 aluminum alloy, which is an aluminum alloyed with magnesium and traces of manganese and chromium.

Overbraided thermoplastic skin 210 is positioned over stringer bladders 208 in a manner such that overbraided thermoplastic skin 210 also contacts portions 236 of overbraided thermoplastic members 206 and caps 214 of bladder 202. During induction heating, overbraided thermoplastic skin 210 is consolidated with overbraided thermoplastic members 206.

In particular, overbraided thermoplastic skin 210 and overbraided thermoplastic members 206 are co-consolidated. Induction heating is used to heat overbraided thermoplastic skin 210 and overbraided thermoplastic members 206 to melting such that overbraided thermoplastic skin 210 and overbraided thermoplastic members 206 are integrated or joined together. In this manner, after consolidation and cooling, overbraided thermoplastic skin 210 and overbraided thermoplastic members 206 together form a single, integrated structure, composite structure 101 in FIG. 1. In some cases, one or more additional consolidation processes may be performed to integrate or join other structural features to composite structure 101.

More specifically, overbraided thermoplastic skin 210 is consolidated with portions 236 of overbraided thermoplastic members 206 to form an integrated composite structure 101. When composite structure 101 takes the form of composite fuselage structure 102, overbraided thermoplastic skin 210 form fuselage skin 132 and overbraided thermoplastic members 206 form fuselage stringers 130.

In these illustrative examples, a plurality of pressurization tubes 238 may be inserted within or passed through stringer bladders 208. Pressurization tubes 238 may at least partially extend into stringer bladders 208. Pressurization tubes 238 help apply pressure within stringer bladders 208. For example, a pressurization system (not shown) may connect to pressurization tubes 238 through tubing to allow an inert gas to flow through pressurization tubes 238.

In some examples, each of pressurization tubes extends into but does not fully extend through a corresponding one of stringer bladders 208. For example, pressurization tubes 238 may open into corresponding ones of stringer bladders 208. This allows the inert gas flowing through pressurization tubes 238 to exit out of pressurization tubes 238 into stringer bladders 208 to thereby pressurize stringer bladders 208. In other examples, each of pressurization tubes 238 may extend through the entire length of the corresponding one of stringer bladders 208. But in these cases, pressurization tubes 238 have openings (e.g., perforations, slits, holes or some other type of openings) that allow the inert gas to enter stringer bladders 208. The pressurization system controls the flow of the inert gas and uses the inert gas to control the pressure within stringer bladders 208.

In one illustrative example, pressurization tubes 238 are comprised of aluminum. In other examples, pressurization tubes 238 may be comprised of stainless steel, some other type of material, or a combination thereof. The pressurization system may use the inert gas to increase the pressure within pressurization tubes 238, and thereby stringer bladders 208. During induction heating, this pressurization helps stringer bladders 208 expand to provide support to overbraided thermoplastic members 206 to prevent overbraided thermoplastic from caving in (or collapsing inward) or otherwise moving out of a desired shape. Additionally, this pressurization helps stringer bladders 208 expand to provide a smooth surface for overbraided thermoplastic members 206 and overbraided thermoplastic skin 210.

Further, the pressure within bladder 202 may also be controlled using pressurization tube 240 that extends into bladder 202 and the pressurization system described above. For example, pressurization tube 240 may also be comprised of aluminum. In other examples, pressurization tube 240 may be comprise of stainless steel, some other material, or a combination thereof. The pressurization system may use the inert gas to control the pressure within pressurization tube 240, and thereby bladder 202, similar to pressurization tubes 238.

In one illustrative example, pressurization tube 240 enters into bladder 202 without extending all the way through bladder 202. In this manner, inert gas may flow out of pressurization tube 240 and into bladder 202 to thereby pressurize bladder 202. In other examples, pressurization tube 240 has openings (e.g., perforations, slits, holes, or some other type of opening) that allows gas to flow from pressurization tube 240 into bladder 202.

Each of stringer bladders 208 is pressurized to a substantially same pressure (i.e., a same pressure within selected tolerances) during consolidation. This helps ensure that the expansion of each of stringer bladders 208 is even such that the same force is applied to each of overbraided thermoplastic members 206 during consolidation. In some cases, bladder 202 and stringer bladders 208 are pressurized to a substantially same pressure during consolidation of overbraided thermoplastic members 206 to overbraided thermoplastic skin 210. Increasing the pressure within bladder 202 and stringer bladders 208 causes some expansion, which places the preform (i.e., overbraided thermoplastic members 206 and overbraided thermoplastic skin 210) in tension during processing. Further, this expansion helps co-consolidate stackup 112 during processing by pushing against or compressing stackup 112 against outer tooling 110.

System 103 of FIG. 1 with stackup 112 of FIGS. 1 and 2 allows consolidation of overbraided thermoplastic members 206 with overbraided thermoplastic skin 210 to form composite structure 101 in an efficient manner at rapid rates. In particular, using induction heating via induction coils 118, induction coils 120, first smart susceptor 114, and second smart susceptor 115 helps ensure a rapid and reliable consolidation process.

The illustrations of manufacturing environment 100 and system 103 in FIG. 1 and stackup 112 in FIGS. 1 and 2 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 3A:
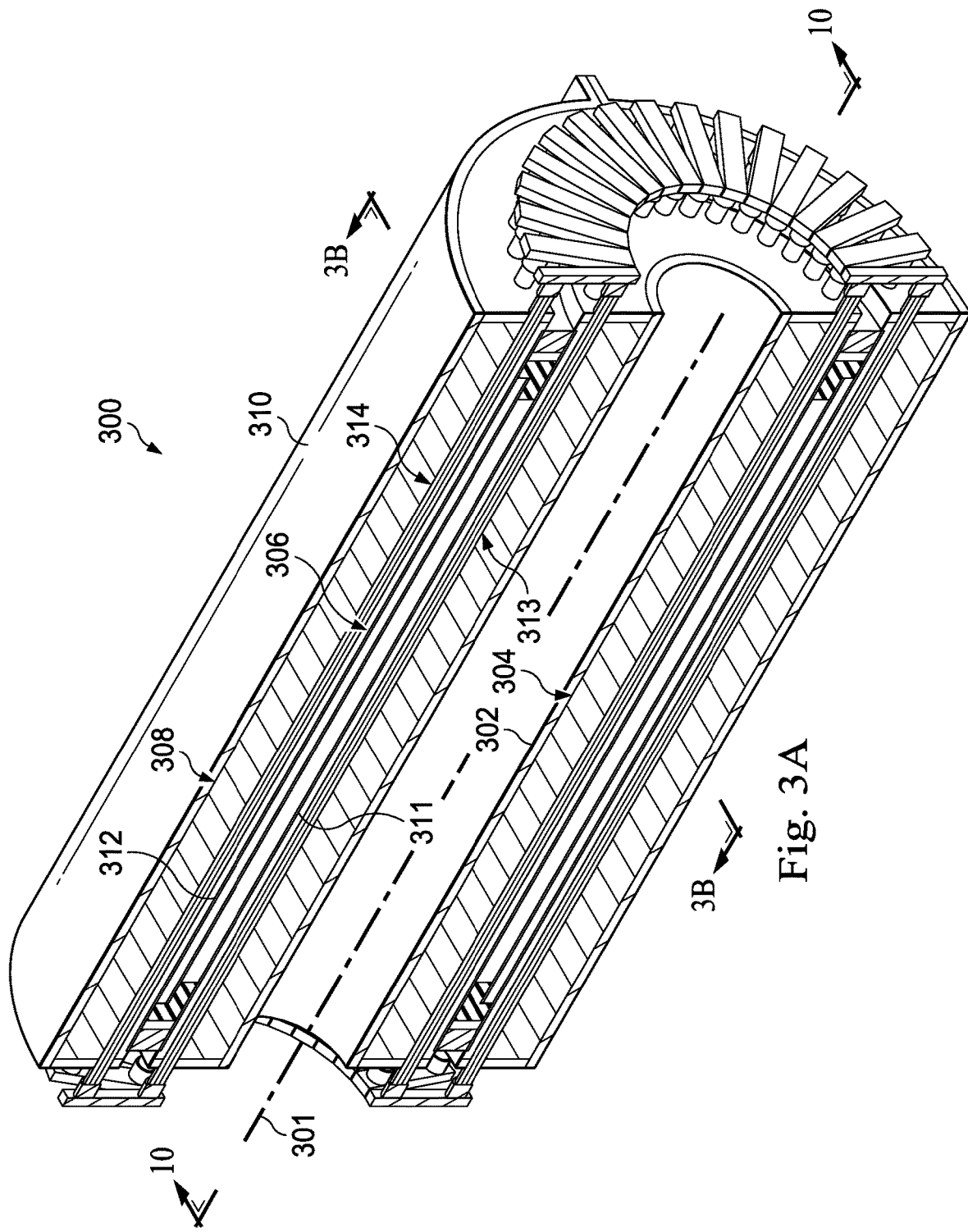
FIG. 3A is an illustration of an isometric view of a consolidation setup in accordance with an example embodiment.
Figure 3B:
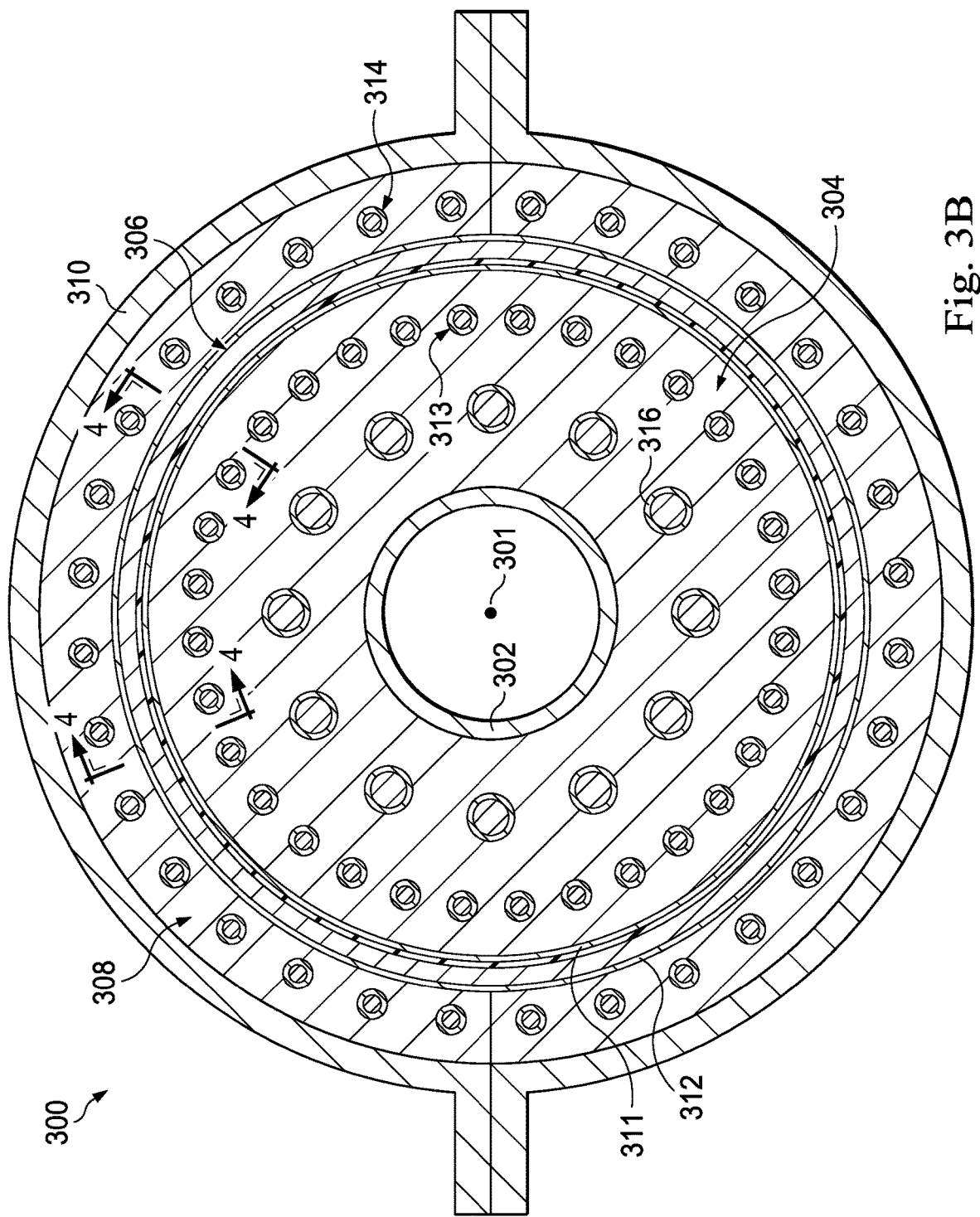
FIG. 3B is an illustration of a cross-sectional view of the consolidation setup from FIG. 3A in accordance with an example embodiment.

FIGS. 3A and 3B are illustrations of a consolidation setup in accordance with an example embodiment. FIG. 3A is an illustration of an isometric cross-sectional view of the consolidation setup. Consolidation setup 300 is an example of one implementation for consolidation setup 104 in FIG. 1.

Consolidation setup 300 includes support structure 302, inner tooling 304, stackup 306, outer tooling 308, and load constraint 310. Consolidation setup 300 further includes first smart susceptor 311 and second smart susceptor 312. First smart susceptor 311 is positioned between inner tooling 304 and stackup 306 and second smart susceptor 312 is positioned between stackup 306 and outer tooling 308.

Support structure 302, inner tooling 304, stackup 306, outer tooling 308, and load constraint 310 are examples of implementations for support structure 116, inner tooling 108, stackup 112, outer tooling 110, and load constraint 117, respectively, in FIG. 1. First smart susceptor 311 and second smart susceptor 312 are examples of implementations for first smart susceptor 114 and second smart susceptor 115, respectively, in FIG. 1. Support structure 302, inner tooling 304, stackup 306, outer tooling 308, load constraint 310, first smart susceptor 311, and second smart susceptor 312 are aligned with respect to longitudinal axis 301 (e.g., center longitudinal axis). In one illustrative example, these components are concentrically aligned with respect to longitudinal axis 301.

FIG. 3B is an illustration of a cross-sectional view of the consolidation setup from FIG. 3A. The cross-sectional view of consolidation setup 300 in FIG. 3B is taken along a plane perpendicular to longitudinal axis 301 through consolidation setup 104. In particular, the cross-sectional view of consolidation setup 300 in FIG. 3B is taken with respect to lines 3B-3B in FIG. 3A.

In these illustrative examples, support structure 302 provides support to inner tooling 304 and is separate from inner tooling 304. In other illustrative examples, support structure 302 may be considered part of inner tooling 304 or integrated with inner tooling 304. Inner tooling 304 has induction coils 313 embedded within inner tooling 304. Induction coils 313 are an example of one implementation for induction coils 118 in FIG. 1. Outer tooling 308 has induction coils 314 embedded within outer tooling 308. Induction coils 314 are an example of one implementation for induction coils 118 in FIG. 1.

In one or more illustrative examples, inner tooling 304, stackup 306, outer tooling 308, and load constraint 310 are substantially cylindrical structures. For example, inner tooling 304, stackup 306, outer tooling 308, and load constraint 310 may be concentrically aligned with respect to longitudinal axis 301. In one illustrative example, inner tooling 304 is formed from a single cylindrical structure. In other illustrative examples, inner tooling 304 is formed from two halves that may be put together to form a cylindrical structure.

Both inner tooling 304 and outer tooling 308 may be comprised of a ceramic material. Ceramic material is a dielectric material that is "transparent" to and does not react with the magnetic energy produced by induction coils 313 and induction coils 314. In this manner, the magnetic energy can pass through the ceramic material to interact with first smart susceptor 311 and second smart susceptor 312. First smart susceptor 311 and second smart susceptor 312 convert the magnetic energy to thermal energy, but the ceramic material is considered "opaque" to the thermal energy so that the thermal energy does not pass through the ceramic material. In this manner, the ceramic material helps prevent the loss of thermal energy during induction heating by working as a thermal insulator. Further, ceramic material has a low coefficient of thermal expansion that helps inner tooling 304 and outer tooling 308 withstand the thermal gradients associated with the other components of consolidation setup 300 during induction heating.

In these illustrative examples, inner tooling 304 includes rods 316 embedded within this ceramic material. Rods 316 are positioned substantially parallel to longitudinal axis 301. Further, rods 316 may be positioned circumferentially around longitudinal axis 301. As seen in FIG. 3, rods 316 are positioned closer to longitudinal axis 301 than induction coils 313. Rods 316 are an example of one implementation for rods 119 in FIG. 2. Rods 316 are fiberglass rods in these examples. Rods 316 being comprised of fiberglass, which is a dielectric material, helps rods 316 to provide compressive loading within inner tooling 304. Rods 316 help put the ceramic material of inner tooling 304 in compression as the various components of consolidation setup 300 are added onto inner tooling 304, which helps with the long-term durability of inner tooling 304. In this manner, rods 316 reinforce inner tooling 304 and load inner tooling 108 during compression.

Stackup 306 is built up around inner tooling 304. Outer tooling 308 is positioned around stackup 306. In particular, outer tooling 308 is positioned around second smart susceptor 312, which is positioned around stackup 306. Similar to inner tooling 304, outer tooling 308 may be comprised of a ceramic material.

In these illustrative examples, outer tooling 308 is comprised of two halves that are brought together around stackup 306. For example, a fastener system (not shown) may be used to connect the two halves of outer tooling 308. In some cases, load constraint 310 is used to hold the two halves of outer tooling 308 in place. Similarly, load constraint 310 may be comprised of two halves that are brought together around outer tooling 308 to secure outer tooling 308, stackup 306, and inner tooling 304 together. A fastener system (not shown) may be used to connect these two halves of load constraint 310. In some cases, the same fastener system may be used to connect the two halves of both outer tooling 308 and load constraint 310. The fastener system may include, for example, a clamping system (e.g., hydraulic clamps) that allows for easy clamping and easy release. In other illustrative examples, outer tooling 308, load constraint 310, or both may be a single cylindrical structure.

Figure 4:
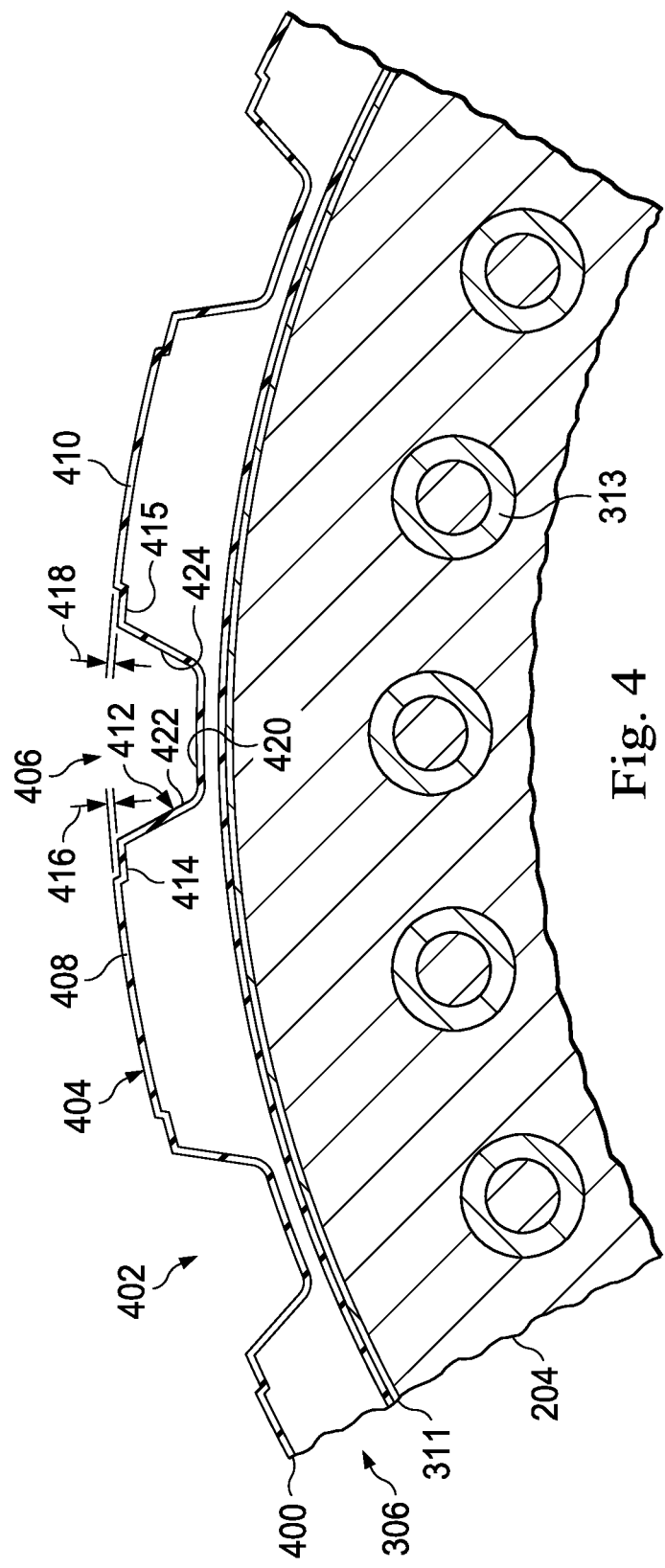
FIG. 4 is an illustration of a portion of the inner tooling from FIG. 3 taken between lines 4-4 in FIG. 3 in accordance with an example embodiment.

FIGS. 4-8 illustrate the buildup of stackup 306 from FIG. 3 over inner tooling 304 in accordance with an example embodiment. FIG. 4 is an illustration of a portion of inner tooling 304 from FIG. 3 taken between lines 4-4 in FIG. 3 in accordance with an example embodiment. First smart susceptor 311 is positioned around inner tooling 304 such that first smart susceptor 311 is positioned within the electromagnetic flux field generated by induction coils 118 when a current is run through induction coils 118.

Bladder 400 is positioned over and around first smart susceptor 311. Bladder 400 is an example of one implementation for bladder 202 in FIG. 2. Bladder 400 is the first component added to form stackup 306 from FIG. 3. Bladder 400 is an aluminum bladder in this illustrative example. During the induction consolidation process, bladder 400 is pressurized. Without pressurization, bladder 400 may be considered "deflated." When pressure is applied to bladder 400, bladder 400 may be considered "inflated." Pressure may be applied to bladder 400 via an inert gas that flows through a pressurization tube (not shown in this view) extending through bladder 400 or a channel that extends through bladder 400.

Bladder 400 includes recessed portions 402 formed between caps 404. Recessed portions 402 are used to help index the locations for the fuselage stringers being formed. Recessed portion 406 is an example of one of recessed portions 402. Recessed portion 406 is formed between cap 408 and cap 410 of caps 404.

Recessed portion 406 is shaped such that recessed portion 406 includes main section 412, stepped section 414, and stepped section 415. Stepped section 414 is located between main section 412 and cap 408 and stepped section 415 is located between main section 412 and cap 410. Stepped section 414 has depth 416 and stepped section 415 has depth 418. Depth 416 is measured as the distance between cap 408 and main section 412 and depth 418 is measured as the distance between cap 410 and main section 412. Depth 416 and depth 418 are substantially equal in this illustrative example.

In this illustrative example, recessed portion 406 (i.e., main section 412, stepped section 414, and stepped section 415) is shaped to receive a caul that is shaped to form a "hat" stringer. For example, main section 412 may include base section 420 (forming the "cap" portion of the hat stringer) and web section 422 and web section 424 that extend from base section 420 to stepped section 414 and stepped section 415, respectively. In other illustrative examples, recessed portion 406 may be shaped to receive some other type of caul.

Figure 5:
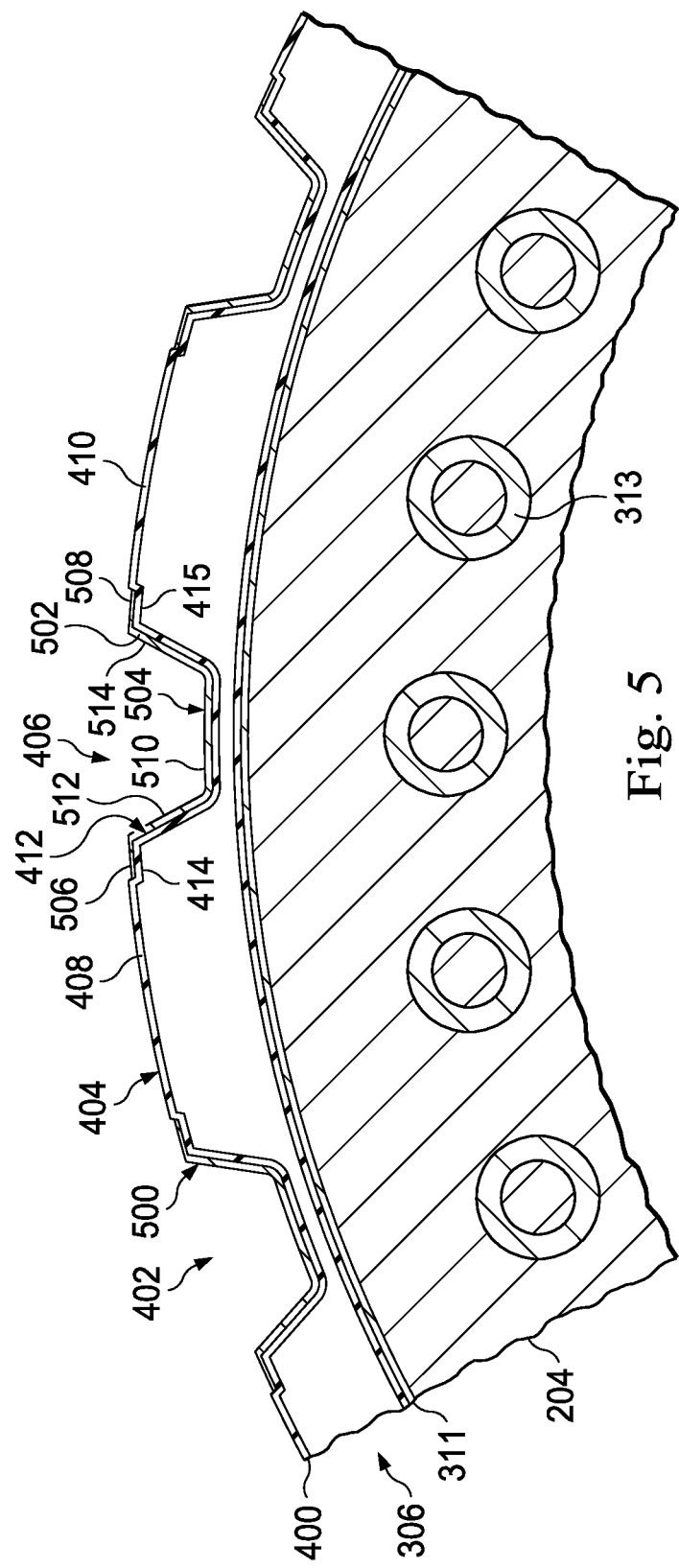
FIG. 5 is an illustration of cauls added to the stackup from FIG. 4 in accordance with an example embodiment.

FIG. 5 is an illustration of cauls added to stackup 306 from FIG. 4 in accordance with an example embodiment. Cauls 500 are positioned within recessed portions 402 of bladder 400. Cauls 500 are an example of one implementation for cauls 204 in FIG. 2. In particular, each of cauls 500 is positioned within a corresponding one of recessed portions 402.

Further, each of cauls 500 is shaped such that the caul substantially conforms to or matches the shape of the corresponding recessed portion within which it is placed. In these illustrative examples, cauls 500 are shaped to enable the formation of "hat" stringers.

As previously described, cauls 500 may have a coefficient of thermal expansion that is sufficiently close to the coefficient of thermal expansion of overbraided thermoplastic members that will be later positioned over cauls 500 to thereby reduce or prevent undue stress from being introduced to the thermoplastic material. Cauls 500 are used to provide strength and rigidity during induction heating because bladder 400 softens during induction heating.

For example, caul 502 of cauls 500 is positioned within recessed portion 406. Caul 502 is an example of one implementation for caul 228 in FIG. 2. Caul 502 is shaped to substantially conform to or match the shape of recessed portion 406. Specifically, caul 502 is shaped to substantially match the shape of main section 412, stepped section 414, and stepped section 415 of recessed portion 406.

For example, caul 502 includes main section 504, flanged section 506, and flanged section 508. Main section 504 is shaped to fit securely within main section 412 of recessed portion 406. As previously described, main section 412 forms at least a portion of a cross-sectional hat shape. Thus, similar to main section 412, main section 504 similarly includes base section 510, web section 512, and web section 514. Flanged section 506 and Flanged section 508 are shaped to sit securely within stepped section 414 and stepped section 415, respectively, of recessed portion 406. In this illustrative example, flanged section 506 has a thickness less than depth 416 of stepped section 414. Flanged section 508 has a thickness less than depth 418 of stepped section 415.

Figure 6:
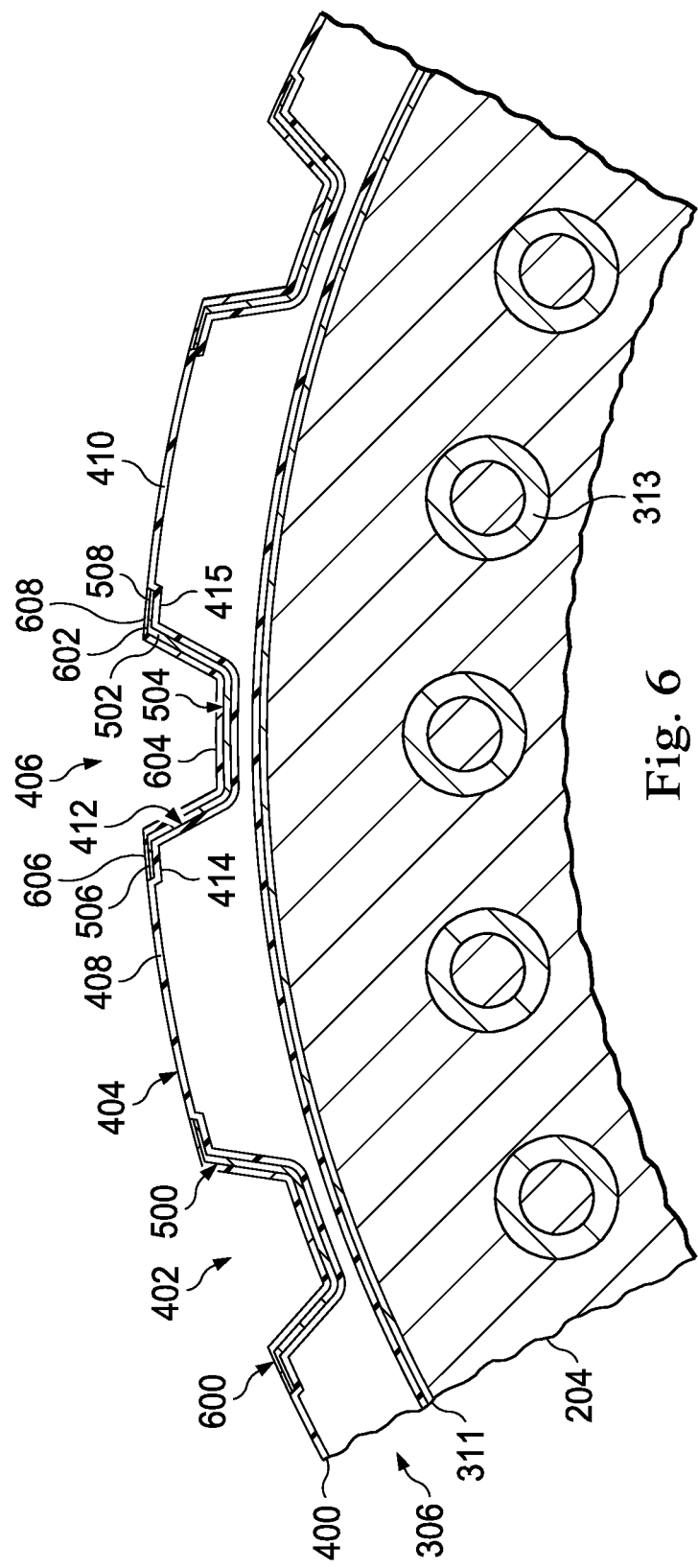
FIG. 6 is an illustration of overbraided thermoplastic members added to the stackup from FIG. 5 in accordance with an example embodiment.

FIG. 6 is an illustration of overbraided thermoplastic members added to stackup 306 from FIG. 5 in accordance with an example embodiment. Overbraided thermoplastic members 600 are positioned over cauls 500. Overbraided thermoplastic members 600 are examples of implementations for overbraided thermoplastic members 206 in FIG. 2. Each of overbraided thermoplastic members 600 is positioned over a corresponding one of cauls 500.

In some illustrative examples, overbraided thermoplastic members 600 are laid up directly over cauls 500 after cauls 500 have been added to stackup 306. In other illustrative examples, overbraided thermoplastic members 600 may be added to stackup 306 at the same time as cauls 500. For example, overbraided thermoplastic members 600 may be laid up over cauls 500 prior to being added to stackup 306. Cauls 500 may then be used to transport and locate overbraided thermoplastic members 600 in the various recessed portions of bladder 400.

Further, each of overbraided thermoplastic members 600 is substantially conformed to the shape of the corresponding caul. Overbraided thermoplastic members 600 will ultimately form "hat" stringers.

As one example, overbraided thermoplastic member 602 is positioned over caul 502, which is positioned within recessed portion 406 of bladder 400. Overbraided thermoplastic member 602 is substantially conformed to the shape of caul 502. Specifically, overbraided thermoplastic member 602 is substantially conformed to the shape of main section 504, flanged section 506, and flanged section 508 of caul 502. This shaping of overbraided thermoplastic member 602 results in overbraided thermoplastic member 602 having main section 604, flanged section 606 and flanged section 608.

In this illustrative example, flanged section 606 of overbraided thermoplastic member 602 and flanged section 506 of caul 502 have a combined thickness that is substantially equal to depth 416 of stepped section 414 of recessed portion 406 of bladder 400. Similarly, flanged section 608 of overbraided thermoplastic member 602 and flanged section 508 of caul 502 have a combined thickness that is substantially equal to depth 418 of stepped section 415 of recessed portion 406 of bladder 400. In this manner, overbraided thermoplastic member 602 does not extend past the circumferential profile of cap 408 or cap 410.

Figure 7:
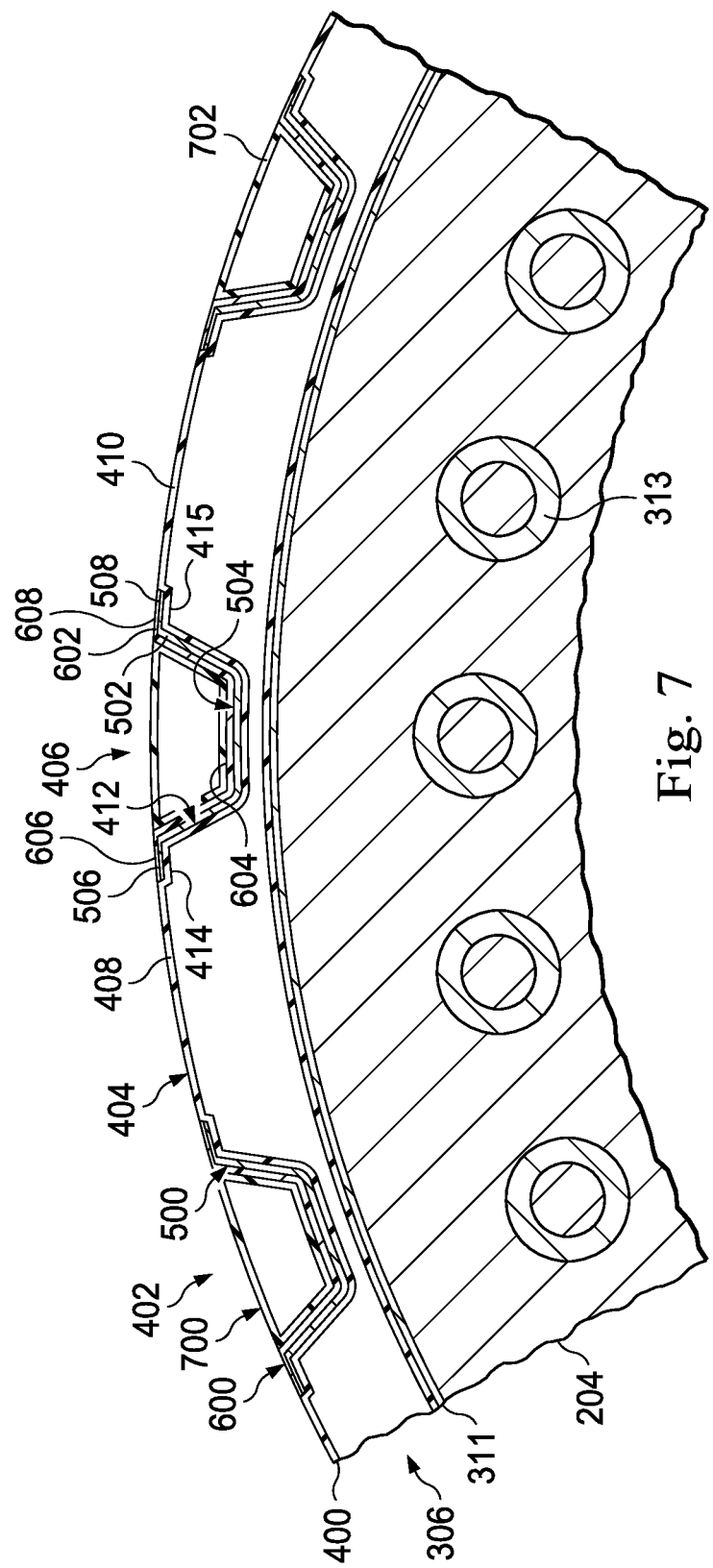
FIG. 7 is an illustration of stringer bladders added to the stackup from FIG. 6 in accordance with an example embodiment.

FIG. 7 is an illustration of stringer bladders added to stackup 306 from FIG. 6 in accordance with an example embodiment. Stringer bladders 700 are positioned over overbraided thermoplastic members 600. Stringer bladders 700 are an example of one implementation for stringer bladders 208 in FIG. 1. Each of stringer bladders 700 is shaped to ensure that overbraided thermoplastic members 600 retain their desired shape for the formation of "hat" stringers.

Each of stringer bladders 700 is positioned over a corresponding one of overbraided thermoplastic members 600. For example, stringer bladder 702 is positioned over overbraided thermoplastic member 602.

In this illustrative example, stringer bladder 702 is shaped to ensure that overbraided thermoplastic member 602 maintains its shape during heating. Together, recessed portion 406 of bladder 400, caul 502, and stringer bladder 702 support both sides of overbraided thermoplastic member 602, while securing overbraided thermoplastic member 602 in place. Stringer bladder 702 is shaped and sized such that side 704 of stringer bladder 702 follows the general circumferential outline formed by caps 404 of bladder 400.

Similar to bladder 400, stringer bladders 700 are pressurized during the induction consolidation process. Without pressurization, stringer bladders 700 may be considered "deflated." Once pressurized, stringer bladders 700 may be considered "inflated."

Figure 8:
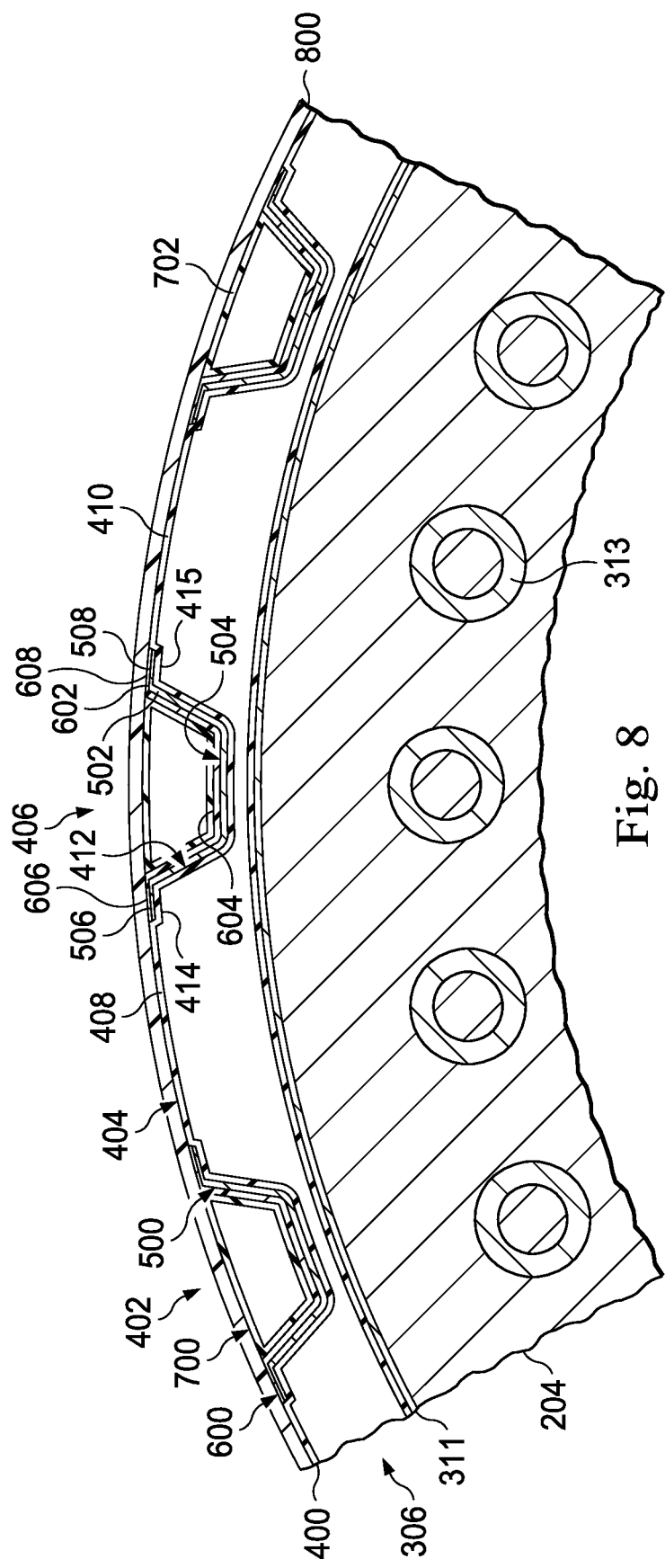
FIG. 8 is an illustration of an overbraided thermoplastic skin added to the stackup from FIG. 7 in accordance with an example embodiment.

FIG. 8 is an illustration of an overbraided thermoplastic skin added to stackup 306 from FIG. 7 in accordance with an example embodiment. Overbraided thermoplastic skin 800 is positioned over caps 404 of bladder 400, stringer bladders 700, and selected portions of overbraided thermoplastic members 600. In particular, overbraided thermoplastic skin 800 is positioned such that overbraided thermoplastic skin 800 contacts the flanged sections of overbraided thermoplastic members 600. For example, overbraided thermoplastic skin 800 contacts flanged section 606 and flanged section 608 of overbraided thermoplastic member 602.

In this illustrative example, overbraided thermoplastic skin 800 surrounds the entire circumference of the portion of stackup 306 formed by bladder 400, cauls 500, overbraided thermoplastic members 600, and stringer bladders 700. The addition of overbraided thermoplastic skin 800 completes the formation of stackup 306 in these illustrative examples.

Figure 9:
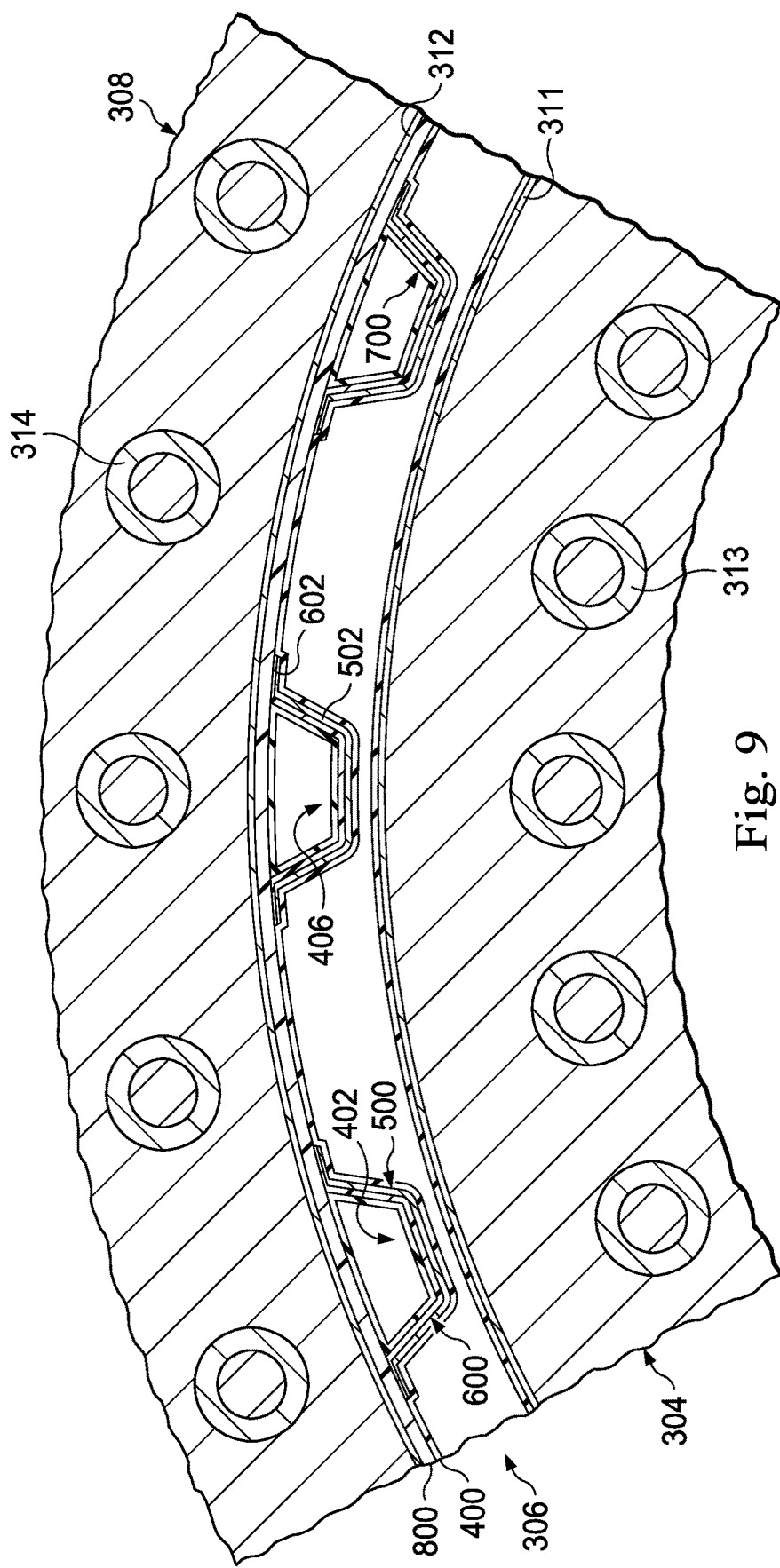
FIG. 9 is an illustration of the second smart susceptor and outer tooling positioned around the stackup from FIG. 8 in accordance with an example embodiment.

FIG. 9 is an illustration of second smart susceptor 312 and outer tooling 308 positioned around stackup 306 from FIG. 8 in accordance with an example embodiment. Second smart susceptor 312 is positioned around overbraided thermoplastic skin 800. Outer tooling 308 is positioned around second smart susceptor 312. This placement ensures that second smart susceptor 312 is positioned within the electromagnetic flux field generated by induction coils 314 when a current is run through induction coils 314.

Through induction coils 313 and induction coils 314, first smart susceptor 311 and second smart susceptor 312 are used to heat and cause consolidation of overbraided thermoplastic skin 800 and overbraided thermoplastic members 600. This consolidation results in a final fuselage structure comprised of a fuselage skin with integrated fuselage stringers.

Figure 10:
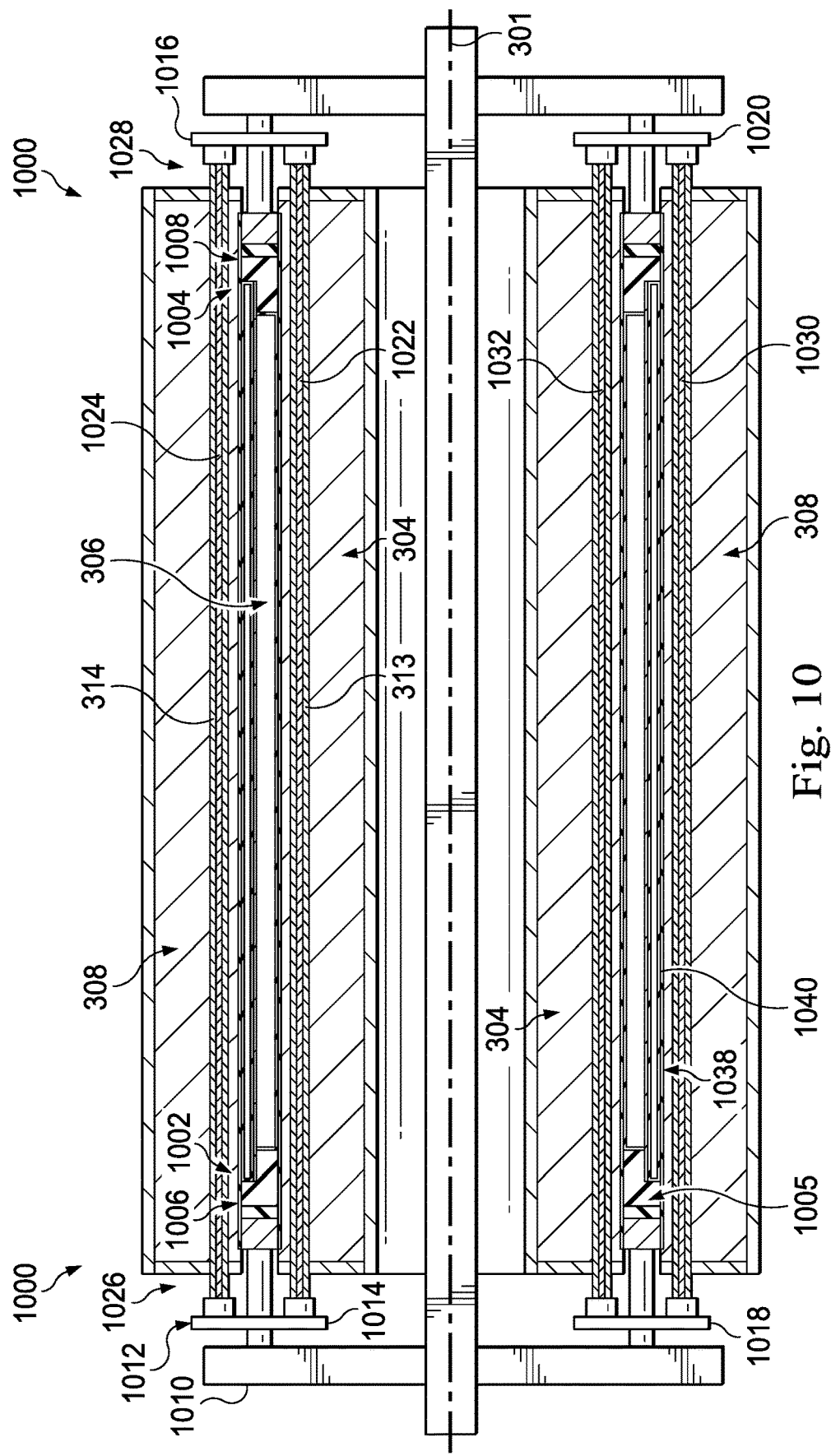
FIG. 10 is an illustration of a cross-sectional view of a system for supporting the consolidation setup during consolidation in accordance with an example embodiment.

FIG. 10 is an illustration of a longitudinal cross-sectional view of a system for supporting consolidation setup 300 during consolidation in accordance with an example embodiment. This cross-sectional view of system 1000, and thereby consolidation setup 300, is taken alone a plane substantially parallel to longitudinal axis 301. In particular, this cross-sectional view is taken with respect to lines 10-10 in FIG. 3A and includes additional components that were not shown in FIG. 3A. System 1000 is an example of one implementation for system 113 in FIG. 1.

As depicted in FIG. 10, stackup 306 has first end 1002 and second end 1004. System 1000 includes a plurality of plugs 1005 for use in plugging these ends. In particular, plug 1006 and plug 1008 are used to plug first end 1002 and second end 1004, respectively, of stackup 306.

Plugs 1005 help ensure that the various components of stackup 306 remain in place during induction heating. For example, plugs 1005 do not expand longitudinally to the extent that bladder 400 and stringer bladders 700 may expand to thereby reduce undesired longitudinal expansion of bladder 400 and stringer bladders 700. For example, plugs 1005 may not expand at all or may expand only slightly as compared to bladder 400 and stringer bladders 700. The sizing of plugs 1005 may be selected to help ensure that the various components of stackup 306 remain in place during induction heating.

Further, plugs 1005 provide an easy and efficient way of loading and unloading components in system 1000. Plugs 1005 may be removed to allow the various components of stackup 306 to be unloaded longitudinally. For example, bladder 400 and stringer bladders 700 may be slid out of system 1000 in a longitudinal direction when plugs 1005 are removed.

System 1000 further includes end tooling 1010 that is used to locate and secure plug 1006 and plug 1008. End tooling 1010 may be, for example, a structural frame or system that helps secure plug 1006 and plug 1008 in place relative to stackup 306.

Connector devices 1012 are used to connect induction coils 313 to induction coils 314. In one illustrative example, each of connector devices 1012 is used to connect one of induction coils 313 embedded within inner tooling 304 to a corresponding one of induction coils 314 embedded within outer tooling 308 at a particular end of consolidation setup 300. In some illustrative examples, each of connector devices 1012 is a knife switch connection. For example, each of connector devices 1012 may include a bar of copper or some other highly conductive material that is capable of rotating about a fixed pivot point.

In this example, connector devices 1012 include connector device 1014, connector device 1016, connector device 1018, and connector device 1020. Connector device 1014 connects coil 1022 of induction coils 313 with coil 1024 of induction coils 314 at end 1026 of consolidation setup 300. Connector device 1016 connects coil 1022 with coil 1024 at end 1028 of consolidation setup 300. Connector device 1018 connects coil 1030 of induction coils 313 with coil 1032 of induction coils 314 at end 1026 of consolidation setup 300. Connector device 1020 connects coil 1030 with coil 1032 at end 1028 of consolidation setup 300.

In some illustrative examples, consolidation setup 300 further includes pressure bladders 1038. Each of pressure bladders 1038 is used to apply pressure at a corresponding one of plugs 1005. Pressure bladder 1040 is an example of one of pressure bladders 1038. Pressure bladder 1040 is used to apply pressure to in a manner that improves the electrical contact between first smart susceptor 311 and second smart susceptor 312 (not labeled in this view) and connector device 1014. Pressure bladder 1040 may take the form of a stainless-steel bladder.

Figure 11A:
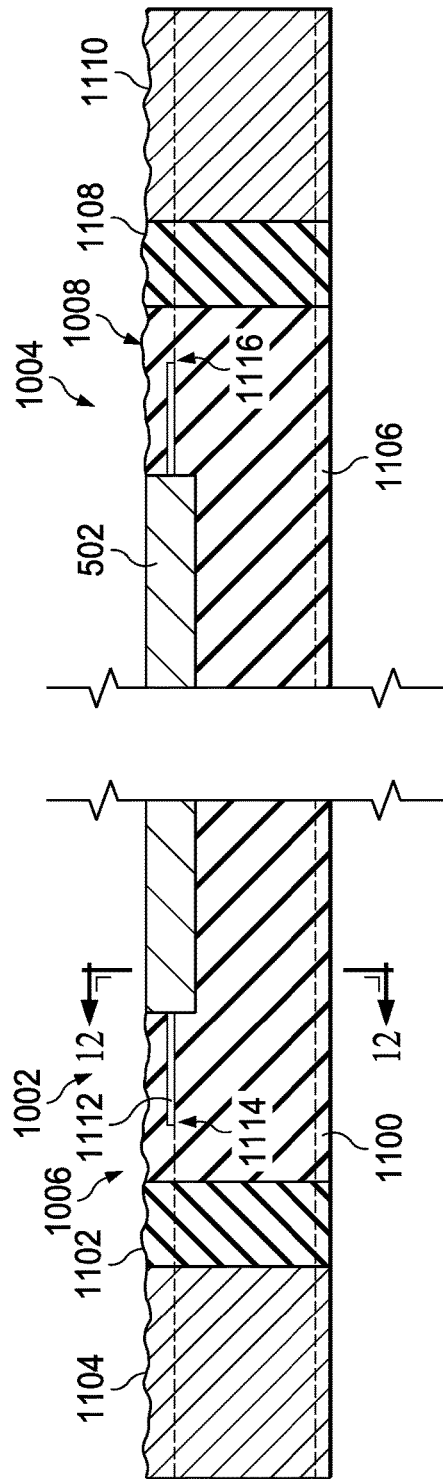
FIG. 11A is an illustration of a portion of the consolidation setup from FIG. 10 in which the plugs are more clearly seen in accordance with an example embodiment.

FIG. 11A is an illustration of a portion of consolidation setup 300 from FIG. 10 in which plug 1006 and plug 1008 are more clearly seen in accordance with an example embodiment. In this view, caul 502 is visible. Stringer bladder 702 located within the recessed portion of caul 502 is also present but not shown in this view. Further, this cross-sectional view is taken so that Plug 1006 and plug 1008 are used to plug first end 1002 and second end 1004 of stackup 306. Plug 1006 and plug 1008 are implemented similarly. In these examples, plug 1006 includes plug portion 1100, thermal insulation layer 1102, and susceptor connector 1104. Plug 1008 similarly includes plug portion 1106, thermal insulation layer 1108, and susceptor connector 1110.

Thermal insulation layer 1102 and thermal insulation layer 1108 provide a way of insulating susceptor connector 1104 and susceptor connector 1110, respectively. These thermal insulation layers may be comprised of, for example, a dielectric material. In these examples, susceptor connector 1104 and susceptor connector 1110 are water-cooled susceptor connectors. If susceptor connector 1104 and susceptor connector 1110 were to get too hot, undesired heating, oxide buildup, or both might occur. Thus, susceptor connector 1104 and susceptor connector 1110 are water-cooled to prevent overheating.

Pressurization tube 1112 is an example of one implementation for one of pressurization tubes 238 in FIG. 2. In these illustrative examples, pressurization tube 1112 extends through stringer bladder 702 of stackup 306 (not shown in this view), past both ends of stringer bladder 702, and out from both first end 1002 and second end 1004 of stackup 306. As depicted, pressurization tube 1112 includes end 1114 and end 1116. In these examples, end 1114 and end 1116 of pressurization tube 1112 extends into plug portion 1100 and plug portion 1106, respectively, but do not extend past these plug portions. In other words, the ends of pressurization tube 1112 do not extend into thermal insulation layer 1102 or thermal insulation layer 1108. In some cases, however, the ends of pressurization tube 1112 may extend all the way through and past plug 1006 and plug 1008.

A pressurization system (not shown) may be used to cause an inert gas to flow through pressurization tube 1112 and into stringer bladder 702 (not shown in this view). For example, both end 1114 and end 1116 may be open and connected to tubing that is connected to the pressurization system to allow the inert gas to flow into pressurization tube 1112. Pressurization tube 1112 may be implemented in various ways.

Figure 11B:
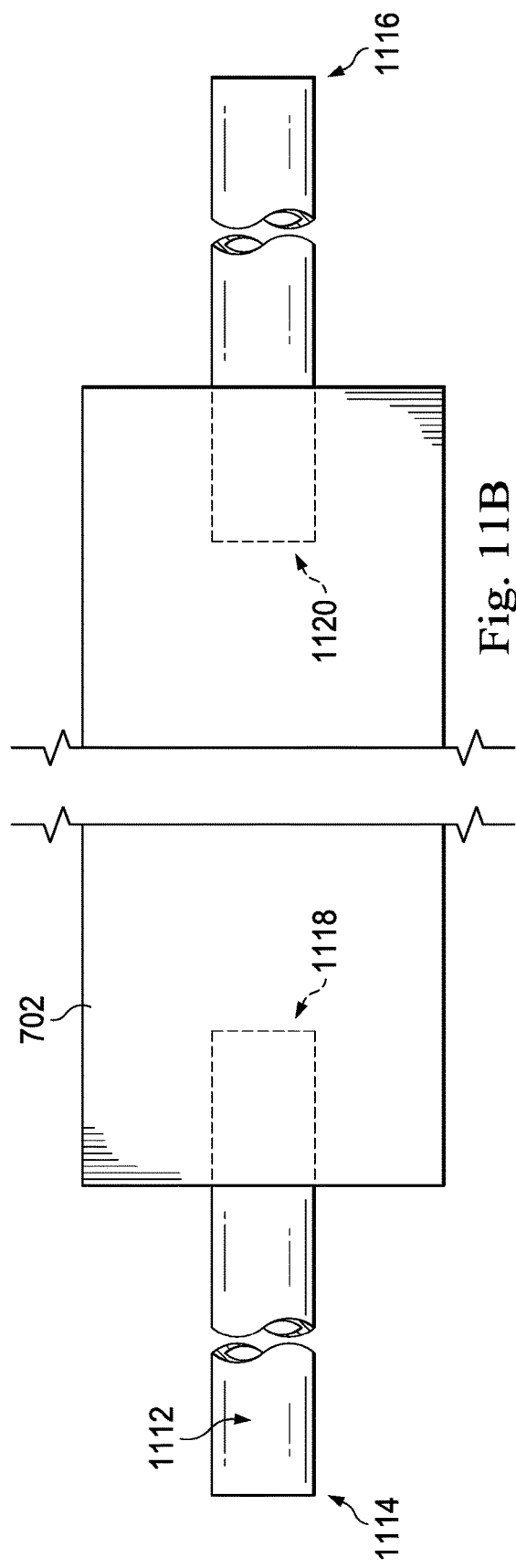
FIG. 11B is an illustration of an enlarged view of one configuration for the pressurization tube from FIG. 11A in accordance with an example embodiment.

FIG. 11B is an illustration of an enlarged view of one configuration for pressurization tube 1112 from FIG. 11A in accordance with an example embodiment. In FIG. 11B, caul 502 from FIG. 11 is not shown such that stringer bladder 702 nested within caul 502 may be more clearly seen. In this illustrative example, pressurization tube 1112 is a discontinuous pressurization tube that enters stringer bladder 702 without extending all the way through stringer bladder 702.

In particular, pressurization tube 1112 includes opening 1118 and opening 1120 that open into stringer bladder 702. In this manner, the inert gas flowing within pressurization tube 1112 may flow out of pressurization tube 1112 and directly into stringer bladder 702 via opening 1118 and opening 1120 to thereby pressurize stringer bladder 702. Opening 1118 and opening 1120 may be sized according to pressurization requirements.

FIG. 11C is an illustration of an enlarged view of another configuration for pressurization tube 1112 from FIG. 11A in accordance with an example embodiment. In FIG. 11C, caul 502 from FIG. 11 is not shown such that stringer bladder 702 nested within caul 502 may be more clearly seen. In this illustrative example, pressurization tube 1112 is a continuous tube that extends all the way through stringer bladder 702. In this example, pressurization tube 1112 has one or more openings 1122 that enable the inert gas to flow out of pressurization tube 1112 and into stringer bladder 702 to thereby pressurize stringer bladder 702. Openings 1122 may take different forms. For example, openings 1122 may be slits, perforations, holes, or some other type of opening in pressurization tube 1112.

FIG. 11D is an illustration of an enlarged view of yet another configuration for pressurization tube 1112 from FIG. 11A in accordance with an example embodiment. In FIG. 11D, caul 502 from FIG. 11 is not shown such that stringer bladder 702 nested within caul 502 may be more clearly seen. In this illustrative example, pressurization tube 1112 is a multitube pressurization tube.

In particular, pressurization tube 1112 includes first tube 1123 and second tube 1124. First tube 1123 is a discontinuous tube that enters stringer bladder 702 and having end 1126 and end 1128 that terminate within stringer bladder 702. Second tube 1124 is a continuous tube located within first tube 1123 that extends from end 1114 to end 1116. For example, second tube 1124 has a smaller diameter than first tube 1123 and may be comprised of a harder material than pressurization tube 1112 to provide structural support to second tube 1124. In one example, first tube 1123 is comprised of aluminum and second tube 1124 is comprised of stainless steel. Second tube 1124 has one or more openings 1130 (e.g., perforations, slits, holes, etc.) that allow an inert gas flowing through second tube 1124 to enter stringer bladder 702.

The inert gas flows into stringer bladder 702 to pressurize stringer bladder 702 and thereby ensure expansion of stringer bladder 702. This expansion helps ensure compression against provide a smooth, well-defined surface for overbraided thermoplastic member 602 shown in FIGS. 7-9.

Figure 12:
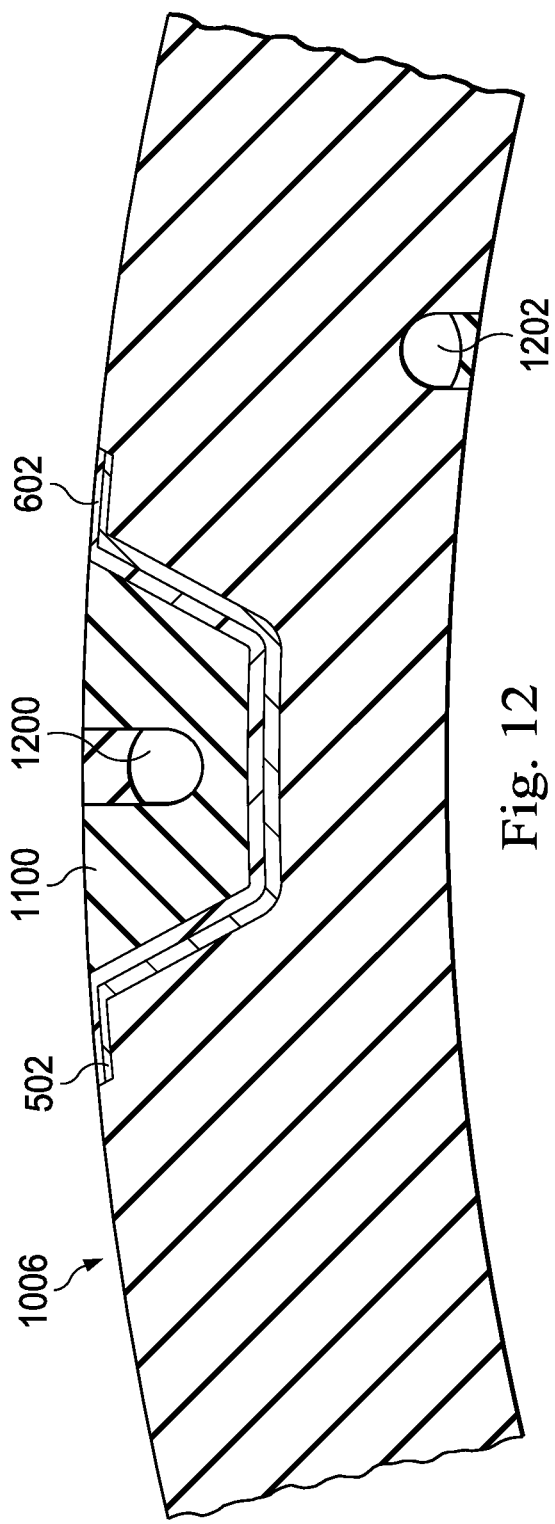
FIG. 12 is an illustration of a cross-sectional view of the stackup taken with respect to lines 12-12 in FIG. 11 in accordance with an example embodiment.

FIG. 12 is an illustration of a cross-sectional view of stackup 306 taken with respect to lines 12-12 in FIG. 11 in accordance with an example embodiment. In this illustrative example, stringer bladder 702 is not shown so, thereby making plug portion 1100 visible.

Channel 1200 extends through stringer bladder 702 and through plug portion 1100 of plug 1008. Channel 1200 is used to receive pressurization tube 1112 from FIG. 11. Channel 1202 extends through plug 1006 and through bladder 400 (not shown in this view). Channel 1202 is used to receive a pressure bladder or pressurization tube that is used to apply pressure to bladder 400 during the induction consolidation process. Channel 1202 may be located anywhere that facilitates gas delivery to bladder 400.

Figure 13A:
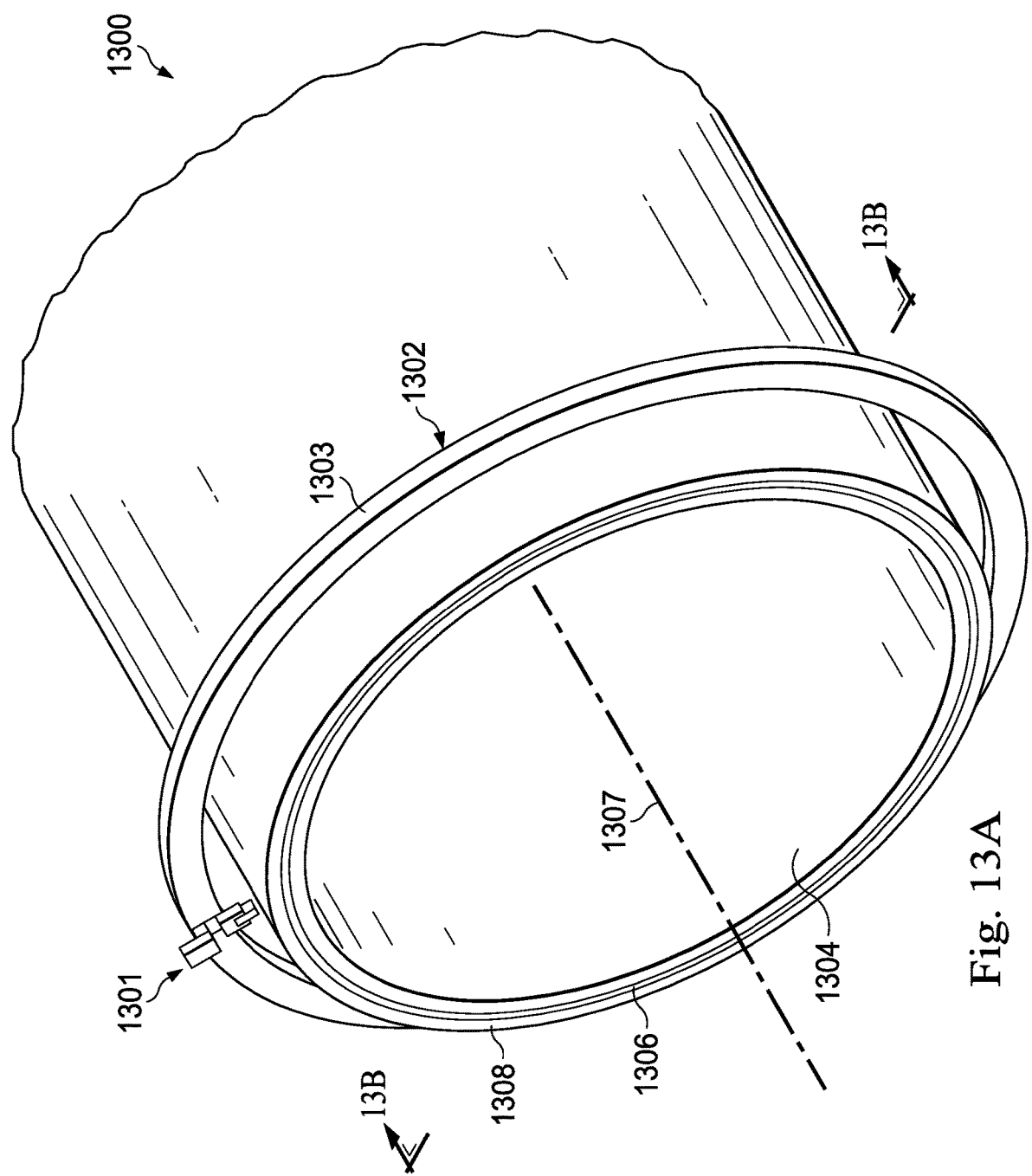
FIG. 13A is an illustration of an isometric view of a tacking-trimming setup in accordance with an example embodiment.
Figure 13B:
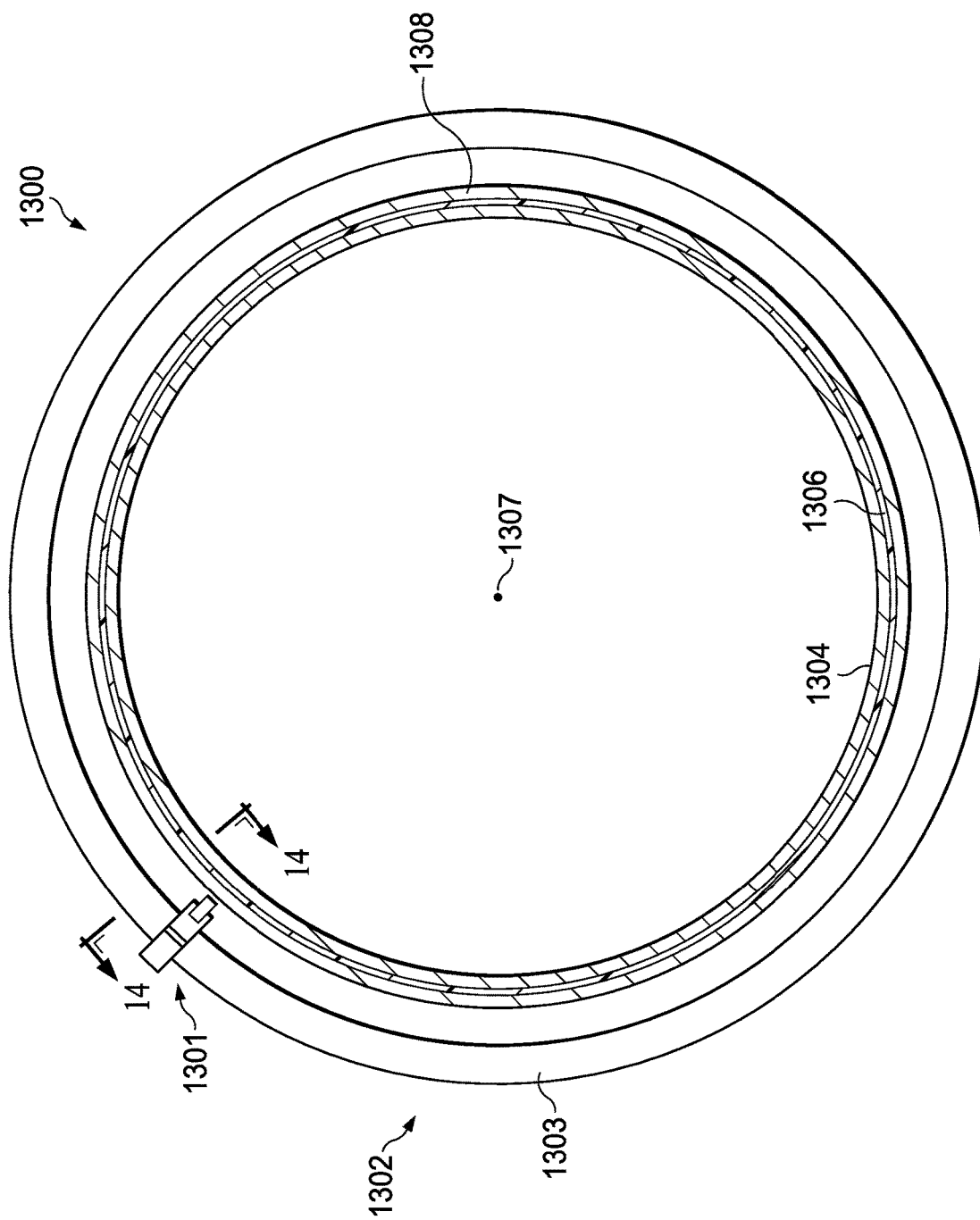
FIG. 13B is an illustration of cross-sectional view of the tacking-trimming setup from FIG. 13A in accordance with an example embodiment.

FIGS. 13A and 13B are illustrations of a tacking-trimming setup in accordance with an example embodiment. FIG. 13A is an illustration of an isometric view of tacking-trimming setup 1300. The tacking-trimming setup 1300 may also be referred to as a tow tacking and trimming apparatus. FIG. 13B is an illustration of a cross-sectional view of tacking-trimming setup 1300. This cross-sectional view of tacking-trimming setup 1300 is taken with respect to lines 13B-13B in FIG. 13A. The description below is in reference to both FIGS. 13A and 13B.

Tacking-trimming setup 1300 may be used to create the "tacking" and "trimming" needed for each braided ply of an overbraided thermoplastic component, such as one of overbraided thermoplastic members 600 or overbraided thermoplastic skin 800 in FIGS. 6-10.

In this illustrative example, tacking-trimming setup 1300 includes tacking-trimming system 1301. Tacking-trimming system 1301 is secured to support system 1302 which surrounds surface 1304. In these illustrative examples, tacking-trimming system 1301 may be secured to support system 1302 using a fastener system, a clamping system, a mounting structure, some other type of attachment device, or a combination thereof. Braided layup 1306, which may be an example of one type of braided structure, is positioned around surface 1304. Braided layup 1306 may be a layup of plies of overbraided continuous thermoplastic composite fibers. Conductive component 1308 is positioned around braided layup 1306.

Although only one tacking-trimming system 1301 is shown secured to support system 1302, any number of tacking-trimming systems may be distributed along support system 1302. In these illustrative examples, support system 1302 includes support ring 1303. Support ring 1303 is sized and shaped to fully surround surface 1304.

Support system 1302 travels with a braiding ring or braider (not shown in this view) to enable the adding and dropping of plies in a direction along longitudinal axis 1307 to create and add to braided layup 1306. In other words, plies may be added and dropped longitudinally. Further, support system 1302 may rotate about longitudinal axis 1307 or tacking-trimming system 1301 may move around support system 1302 to enable the adding and dropping of plies around surface 1304 circumferentially. Conductive component 1308, which may also be referred to as a "shoe," also travels with the braiding ring or braider.

In one illustrative example, surface 1304 may be the surface formed by bladder 400, stringer bladders 700, and overbraided thermoplastic members 600 in FIG. 7 before overbraided thermoplastic skin 800 from FIG. 8 is added. In this example, overbraided thermoplastic skin 800 is laid up over surface 1304 as braided layup 1306. Tacking-trimming system 1301 may be used to tack weld and trim during or after the layup of overbraided thermoplastic skin 800.

In other illustrative examples, surface 1304 may be the surface formed by cauls 500. In these examples, overbraided thermoplastic members 600 from FIG. 6 are laid up over surface 1304 to form braided layup 1306. Tacking-trimming system 1301 may be used to tack weld and trim during or after the layup of overbraided thermoplastic members 600 but prior to the consolidation of overbraided thermoplastic members 600 with overbraided thermoplastic skin 800. In some cases, when overbraided thermoplastic members 600 in FIG. 6 are transported to stackup 306 via cauls 500, tacking-trimming system 1301 may be used to tack weld and trim the already formed layup of overbraided thermoplastic members 600. For example, support system 1302 may be sized and shaped to operatively place tacking-trimming system 1301 relative to stackup 306, which may also be referred to as a cylindrical thermoplastic stackup.

Tack welding may be performed longitudinally, circumferentially, or both. Further, tack welding may be used to add and drop plies in a manner that allows complicated preform structures to be formed. For example, braided layup 1306 may include a plurality of plies that are not all continuous layers. Some plies may be partial layers. In some cases, braided layup 1306 includes padups and pad downs. Thus, braided layup 1306 may have varying thicknesses and contours along braided layup 1306. Tack welding is used to help maintain the structural integrity of braided layup 1306.

In still other illustrative examples, tacking-trimming system 1301 may be used to add local features to braided layup 1306. For example, when braided layup 1306 takes the form of overbraided thermoplastic skin 800 in FIG. 8, tacking-trimming system 1301 may be used to tack weld and trim localized features (e.g., padups) that are added to overbraided thermoplastic skin 800.

In this manner, tacking-trimming system 1301 may be used to provide and maintain a desired architecture for braided layup 1306. In these illustrative examples, tacking-trimming system 1301 is used for tack welding and trimming prior to consolidation. But in other illustrative examples, tacking-trimming system 1301 may be used to tack weld and trim localized layup features that are added to an integrated structure (e.g., fuselage barrel section) that has already gone through at least one consolidation process.

Figure 14:
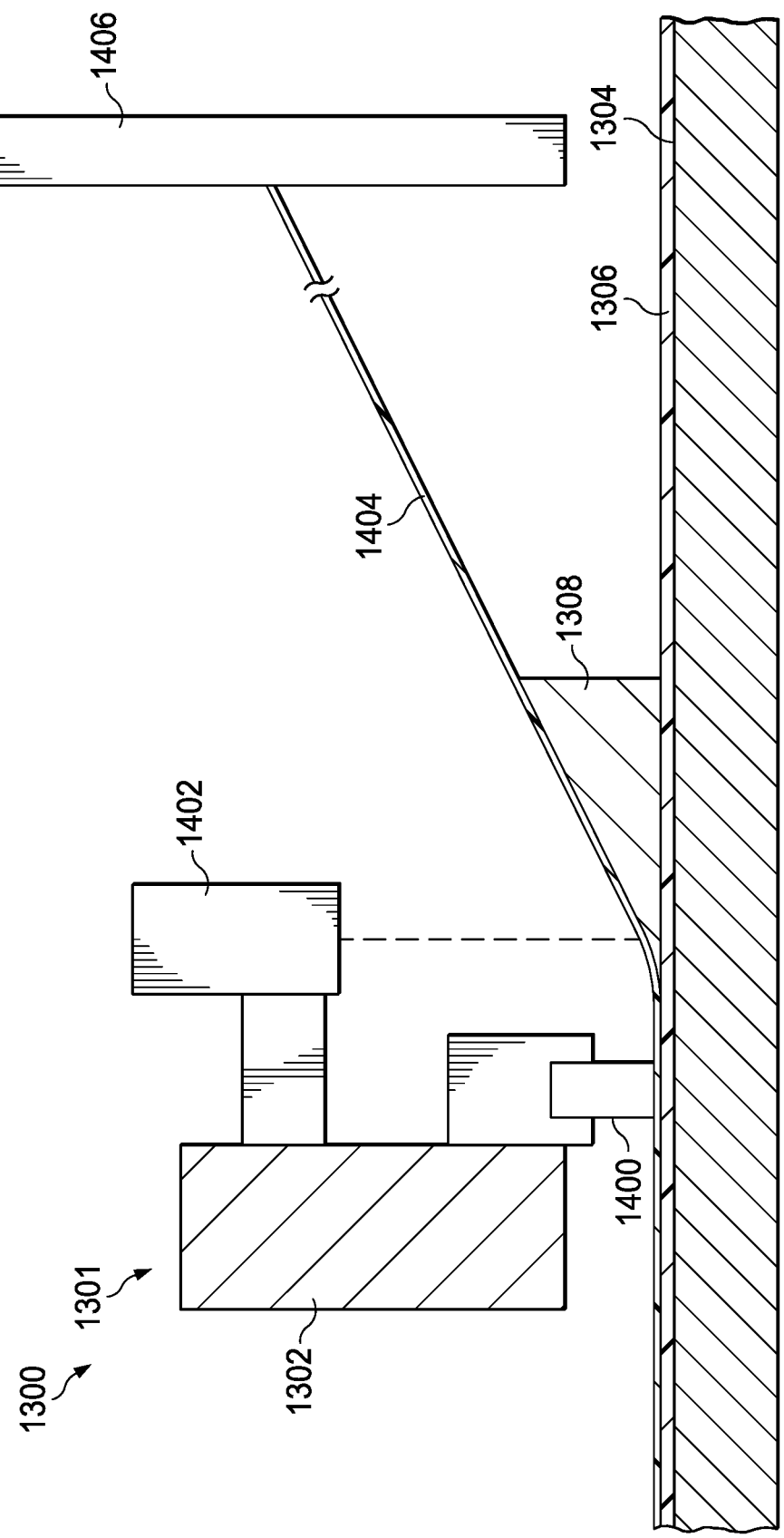
FIG. 14 is an illustration of a cross-sectional view of a portion of the tacking-trimming setup in FIG. 13 in accordance with an example embodiment.

FIG. 14 is an illustration of a cross-sectional view of a portion of tacking-trimming setup 1300 in FIG. 13 in accordance with an example embodiment. This view of tacking-trimming setup 1300 is taken with respect to lines 14-14 in FIG. 13.

As depicted, tacking-trimming system 1301 is secured to support system 1302. Tacking-trimming system 1301 includes tack welder 1400 and trimmer 1402. Tack welder 1400 is positioned to help the laying up of thermoplastic tows along surface 1304 to form braided layup 1306 comprised of thermoplastic plies. Tow 1404 is an example of one of these thermoplastic tows being fed from a braiding ring or a braider. Tack welder 1400 is resistively heated and helps tack tow 1404 to braided layup 1306.

Trimmer 1402 is used to trim tow 1404. Trimmer 1402 may be, for example, without limitation, a laser trimmer. Conductive component 1308 is positioned between tow 1404 and braided layup 1306 to absorb the laser energy emitted by trimmer 1402 and thereby protect braided layup 1306. Conductive component 1308 is thermally conductive in these examples.

The illustrations in FIGS. 3-14 are not meant to imply physical or architectural limitations to the manner in which an illustrative embodiment may be implemented. Other components in addition to or in place of the ones illustrated may be used. Some components may be optional.

The different components shown in FIGS. 3-14 may be illustrative examples of how components shown in block form in FIGS. 1-2 may be implemented as physical structures. Additionally, some of the components in FIGS. 3-14 may be combined with components in FIGS. 1-2, used with components in FIGS. 1-2, or both.

Figure 15:
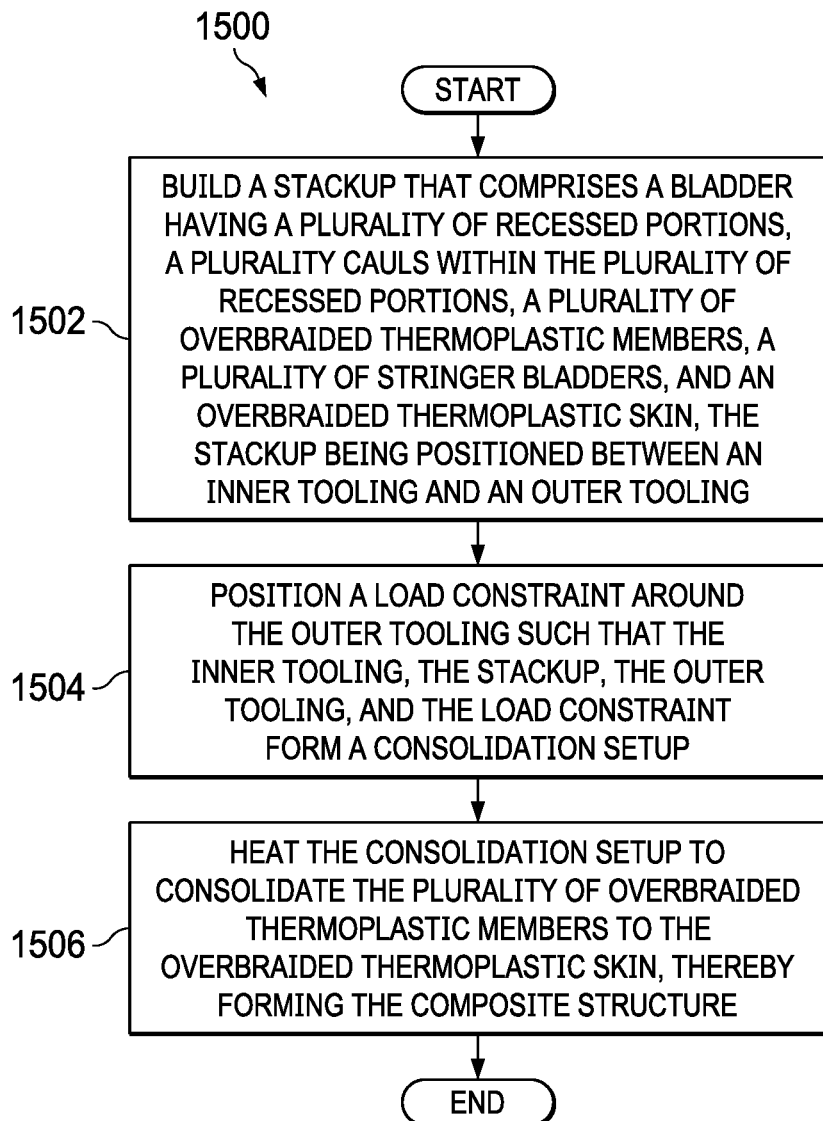
FIG. 15 is a flowchart of a process for forming a composite structure in accordance with an example embodiment.

FIG. 15 is a flowchart of a process for forming a composite structure in accordance with an example embodiment. Process 1500 illustrated in FIG. 15 may be performed using, for example, system 113 described in FIG. 1 to form composite structure 101. In some examples, consolidation setup 300 from FIGS. 3-11 is used to form composite structure 101.

Process 1500 begins by building a stackup that comprises a bladder having a plurality of recessed portions, a plurality cauls within the plurality of recessed portions, a plurality of overbraided thermoplastic members, a plurality of stringer bladders, and an overbraided thermoplastic skin, the stackup being positioned between an inner tooling and an outer tooling (operation 1502). The stackup, the inner tooling, and the outer tooling may be implemented in a manner similar to, for example, stackup 112, inner tooling 108, and outer tooling 110, respectively, in FIG. 1 or stackup 306, inner tooling 304, and outer tooling 308, respectively, in FIGS. 3-8.

In some cases, with respect to operation 1502, the stackup is built over the inner tooling component by component. The outer tooling is then secured over the stackup. In other cases, the stackup is pre-built and then positioned over the inner tooling prior to the outer tooling being positioned over the stackup.

Thereafter, a load constraint is positioned around the outer tooling such that the inner tooling, the stackup, the outer tooling, and the load constraint form a consolidation setup (operation 1504). The consolidation setup is heated inductively to consolidate the plurality of overbraided thermoplastic members to the overbraided thermoplastic skin, thereby forming a composite structure (operation 1506), with the process terminating thereafter. In particular, operation 1506 results in the formation of an integrated composite structure.

In some illustrative examples, operation 1506 may be performed by heating, inductively, a first smart susceptor located between the inner tooling and the stackup and a second smart susceptor located between the outer tooling and the stackup to cause consolidation of the plurality of overbraided thermoplastic members to the overbraided thermoplastic skin. This process forms a plurality of fuselage stringers integrated with a circumferential skin. The plurality of overbraided thermoplastic members form the fuselage stringers and the overbraided thermoplastic skin forms the circumferential skin form a composite fuselage structure, such as composite fuselage structure 102 in FIG. 1.

Figure 16:
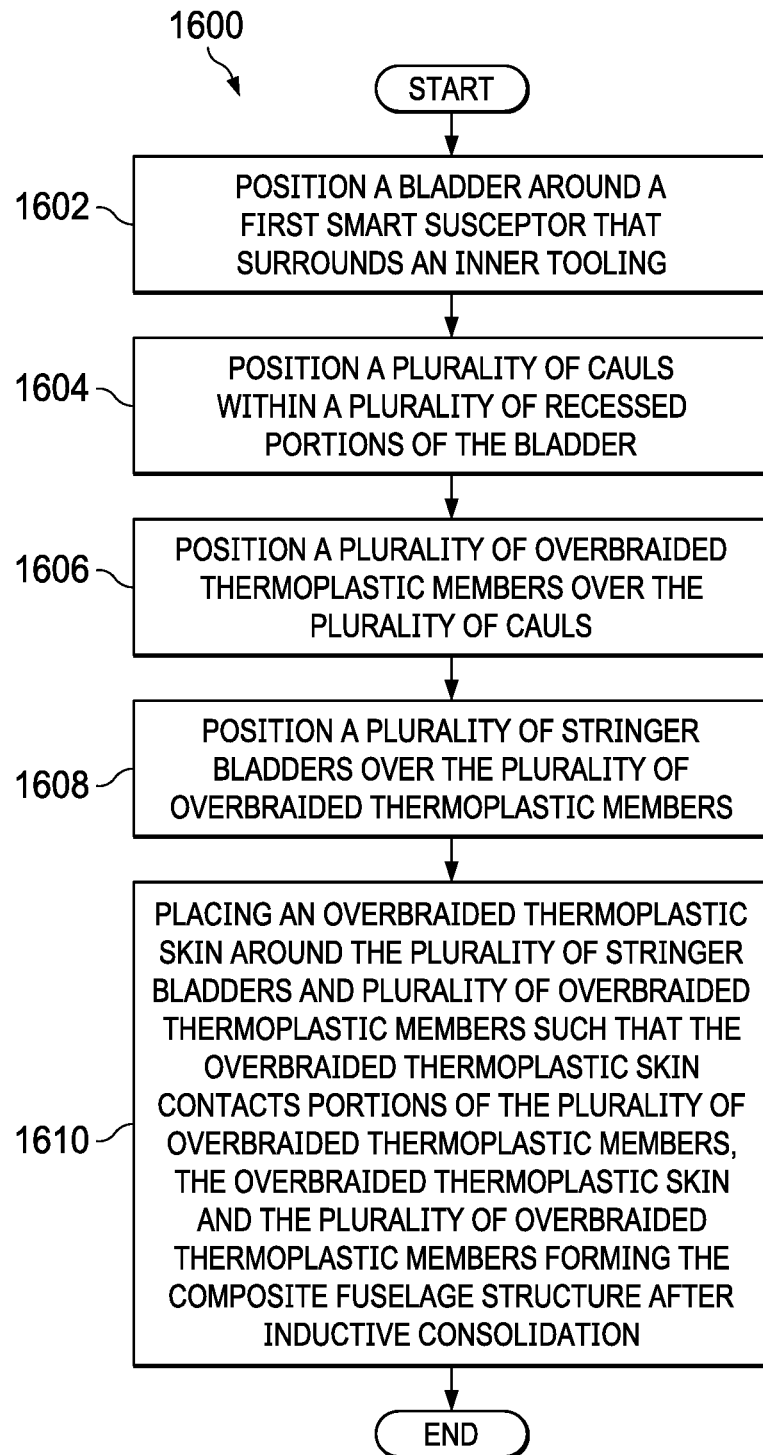
FIG. 16 is a flowchart of a process for building a stackup in accordance with an example embodiment.

FIG. 16 is a flowchart of a process for building a stackup in accordance with an example embodiment. Process 1600 illustrated in FIG. 16 may be performed to build, for example, stackup 112 described in FIG. 1 or stackup 306 described in FIGS. 3-8. Further, process 1600 may be used to implement operation 1502 in FIG. 15.

Process 1600 begins by positioning a bladder around a first smart susceptor that surrounds an inner tooling (operation 1602). The bladder may be comprised of aluminum. In these illustrative examples, the first smart susceptor surround the inner tooling like a liner for the inner tooling.

Thereafter, a plurality of cauls is positioned within a plurality of recessed portions of the bladder (operation 1604). In these illustrative examples, each of the plurality of cauls is comprised of a nickel-iron alloy. In one illustrative example, each of the plurality of cauls is comprised of an invar alloy (e.g., Invar 52).

A plurality of overbraided thermoplastic members is then positioned over the plurality of cauls (operation 1606). In particular, each of the plurality of overbraided thermoplastic members is positioned over and within the recessed portion of a corresponding one of the plurality of cauls. Each of the plurality of overbraided thermoplastic members has a shape similar to the shape of the corresponding caul. The cauls help provide mechanical strength and rigidity during heating to help maintain the shape and smoothness of the plurality of overbraided thermoplastic members.

Next, a plurality of stringer bladders is positioned over the plurality of overbraided thermoplastic members (operation 1608). An overbraided thermoplastic skin is then positioned around the plurality of stringer bladders and plurality of overbraided thermoplastic members such that the overbraided thermoplastic skin contacts end sections of the plurality of overbraided thermoplastic members, the overbraided thermoplastic skin and the plurality of overbraided thermoplastic members forming the composite fuselage structure after inductive consolidation (operation 1610), with the process terminating thereafter. During the inductive consolidation, the overbraided thermoplastic skin is consolidated with or integrated with the overbraided thermoplastic members. The overbraided thermoplastic skin forms the fuselage skin and the overbraided thermoplastic members form the fuselage stringers for the composite fuselage structure.

Figure 17:
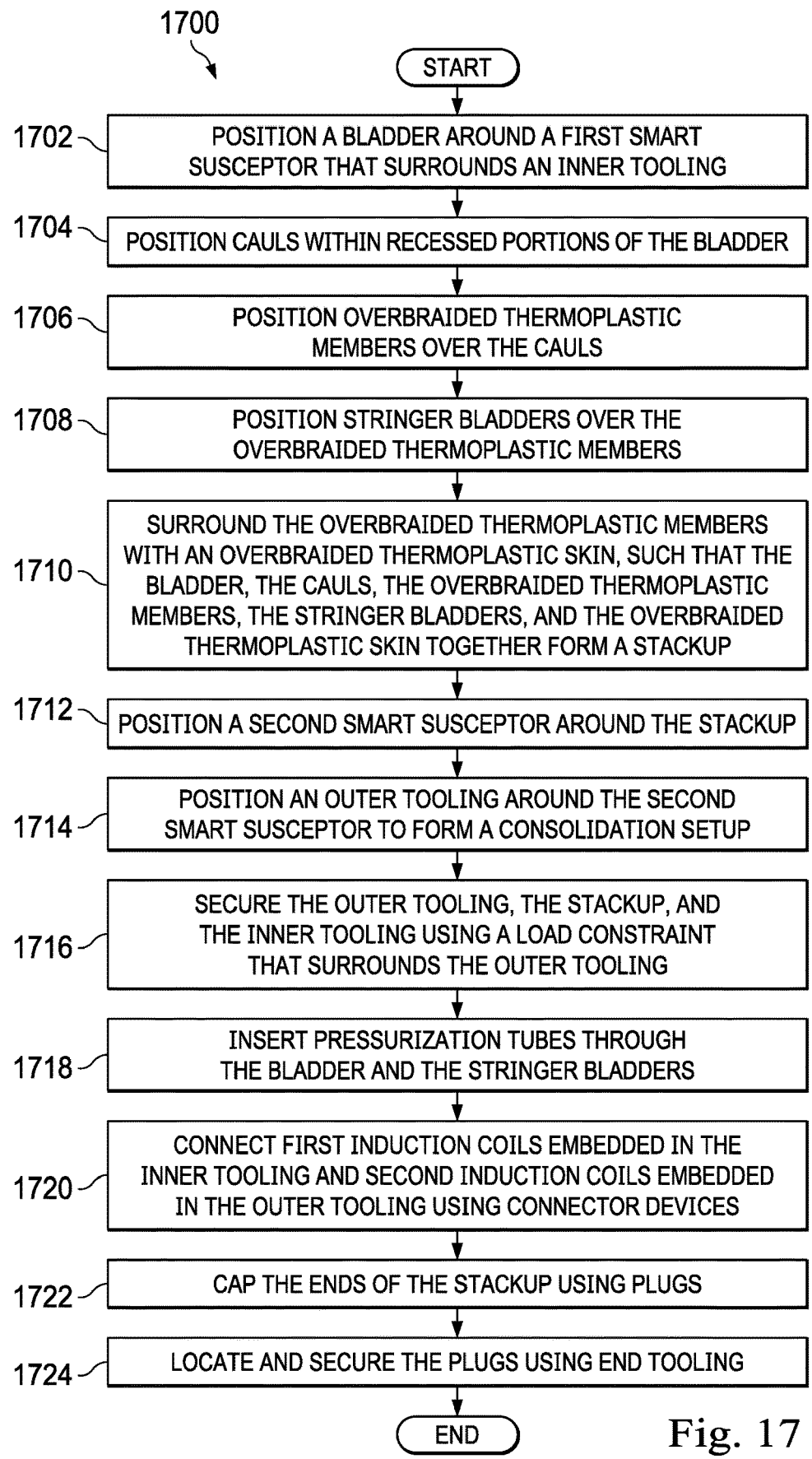
FIG. 17 is a flowchart of a process for building a system that includes a consolidation setup in accordance with an example embodiment.

FIG. 17 is a flowchart of a process for building a system that includes a consolidation setup in accordance with an example embodiment. Process 1700 illustrated in FIG. 17 may be performed to build system 103 that includes consolidation setup 104 described in FIG. 1 or system 1000 that consolidation setup 300 from FIGS. 3-11.

Process 1700 may begin by positioning a bladder around a first smart susceptor that surrounds an inner tooling (operation 1702). The inner tooling includes a plurality of induction coils embedded within the inner tooling. The inner tooling may be supported by a support structure. In these examples, the inner tooling has a circumferential shape (e.g., a cylindrical or near-cylindrical shape, a tapered cylindrical shape, a conical shape, etc.). In one illustrative example, the inner tooling is shaped such that any given cross-section along a longitudinal axis of the inner tooling has a substantially circular (circular or near-circular) shape.

In operation 1702, the bladder may be an aluminum bladder that has a plurality of recessed portions. The bladder may be positioned around the first smart susceptor to surround the first smart susceptor, and thereby the inner tooling.

Cauls are positioned within the recessed portions of the bladder (operation 1704). In operation 1704, the cauls may be comprised of a nickel-iron alloy, such as an invar alloy. Each caul is shaped to substantially conform to or match the shape of the corresponding recessed portion of the bladder within which that caul is positioned. In one illustrative example, the recessed portion of the bladder, and thereby the caul, has an upside-down hat shape.

Overbraided thermoplastic members are then positioned over the cauls (operation 1706). In operation 1706, the overbraided thermoplastic members are shaped to substantially conform to or match the cauls. Thereafter, stringer bladders are positioned over the plurality of overbraided thermoplastic members (operation 1708). The stringer bladders are shaped to nest within the recessed portions or open spaces defined by the overbraided thermoplastic members. These stringer bladders may be comprised of aluminum in these illustrative examples.

The stringer bladders are surrounded with an overbraided thermoplastic skin such that the bladder, the cauls, the overbraided thermoplastic members, the stringer bladders, and the overbraided thermoplastic skin together form a stackup (operation 1710). In operation 1710, the overbraided thermoplastic skin contacts at least portions of the overbraided thermoplastic members. These portions may be the flanged sections of the overbraided thermoplastic members.

A second smart susceptor is then positioned around the overbraided thermoplastic skin (operation 1712). Outer tooling is positioned around the second smart susceptor to form a consolidation setup (operation 1714). Similar to the inner tooling, the outer tooling includes a plurality of induction coils embedded within the outer tooling. A load constraint is then used to secure the outer tooling, the stackup, and the inner tooling (operation 1716).

Pressurization tubes are inserted through the bladder and the stringer bladders (operation 1718), with the process terminating thereafter. As one illustrative example, one pressurization tube may be inserted through a channel in the bladder, while multiple other pressurization tubes may be inserted through the stringer bladders (e.g., a single pressurization tube per stringer bladder). Thus, the consolidation setup includes the inner tooling, the stackup, the outer tooling, the load constraint, and the pressurization tubes. In other illustrative examples, the pressurization tubes may be considered separate from the consolidation setup.

Thereafter, first induction coils embedded in the inner tooling and second induction coils embedded in the outer tooling are connected via connector devices (operation 1720). These connector devices may take the form of, for example, knife switch connectors. The ends of the stackup are capped using plugs (operation 1722). The plugs are located and secured using end tooling (operation 1724), with the process terminating thereafter.

Figure 18:
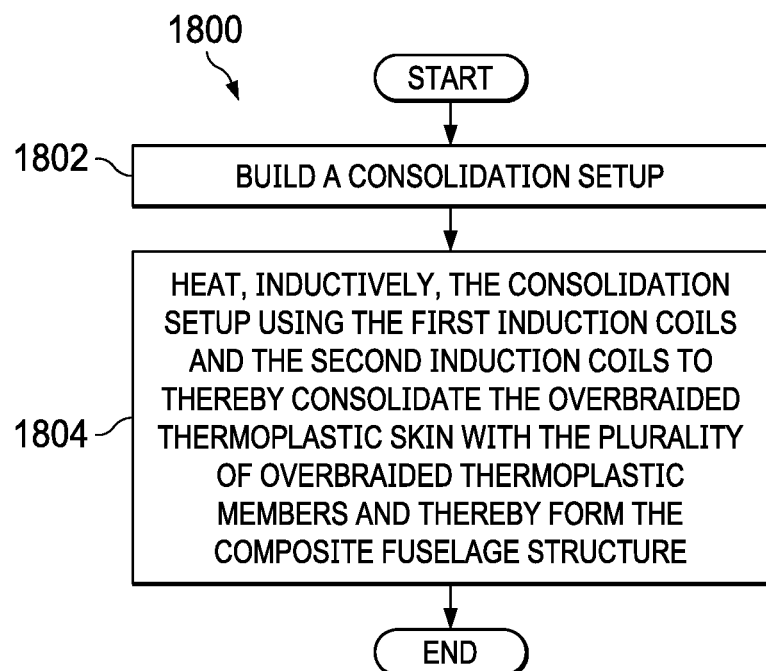
FIG. 18 is a flowchart of a process for building a system to form a composite fuselage structure in accordance with an example embodiment.

FIG. 18 is a flowchart of a process for building a system to form a composite fuselage structure in accordance with an example embodiment. Process 1800 illustrated in FIG. 18 may be performed to build system 113 described in FIG. 1.

Process 1800 may begin by building a consolidation setup (operation 1802). Operation 1802 may be performed using, for example, process 1700 in FIG. 17. For example, the consolidation setup built in operation 1802 that includes an inner tooling embedded with first induction coils, an outer tooling embedded with second induction coils, a first smart susceptor, a second smart susceptor, and a stackup positioned between the first smart susceptor and the second smart susceptor, the stackup including a plurality of overbraided thermoplastic members and an overbraided thermoplastic skin.

Next, the consolidation setup is heated inductively using the first induction coils, the second induction coils, the first smart susceptor, and the second smart susceptor to thereby consolidate the overbraided thermoplastic skin with the plurality of overbraided thermoplastic members to form the composite fuselage structure (operation 1804), with the process terminating thereafter.

Figure 19:
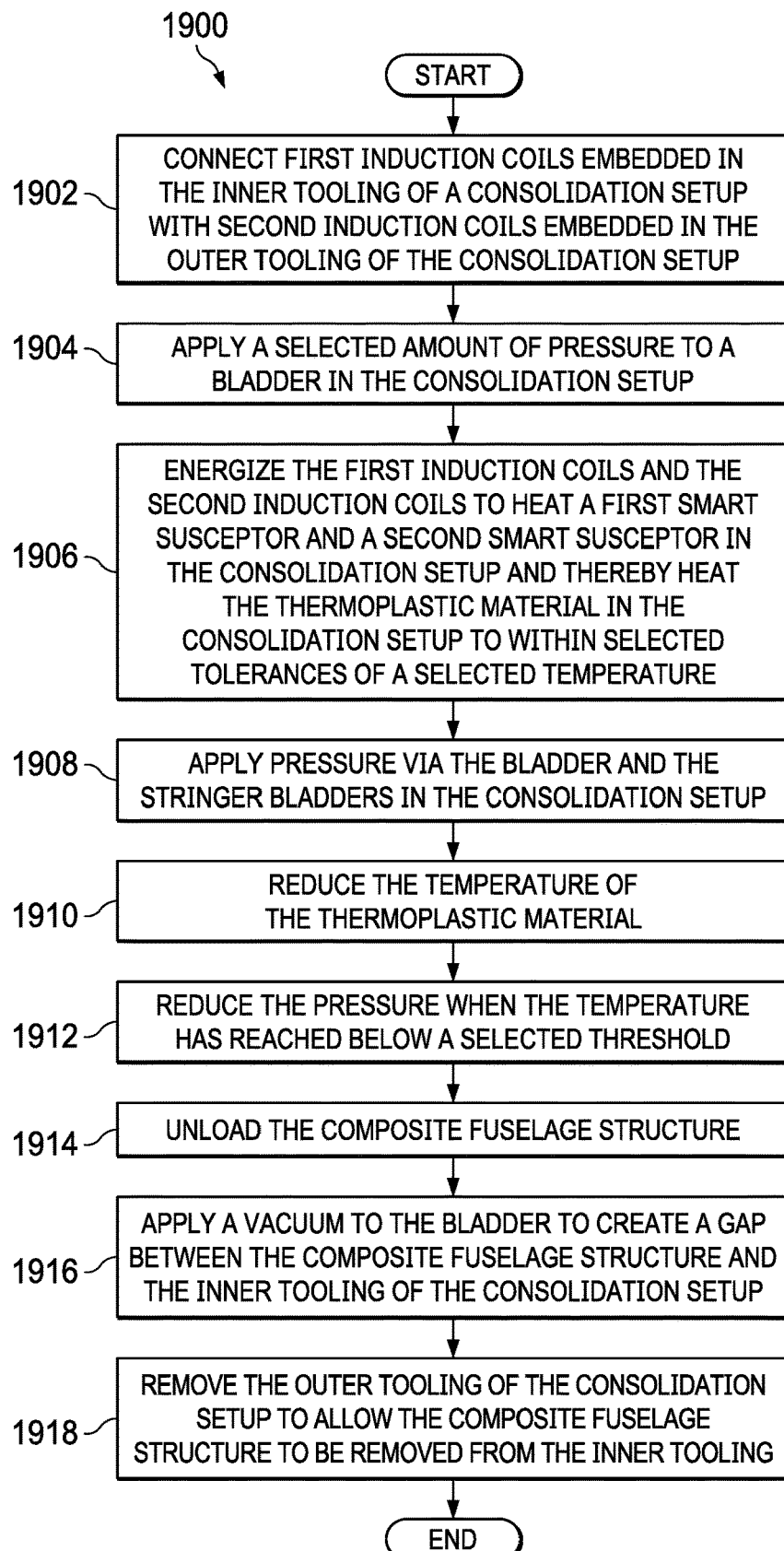
FIG. 19 is a flowchart of a process for inductively consolidating an overbraided thermoplastic skin with overbraided thermoplastic members to form a composite fuselage structure in accordance with an example embodiment.

FIG. 19 is a flowchart of a process for inductively consolidating an overbraided thermoplastic skin with overbraided thermoplastic members to form a composite fuselage structure in accordance with an example embodiment. Process 1900 illustrated in FIG. 19 may be performed to inductively consolidate, for example, overbraided thermoplastic skin 210 with overbraided thermoplastic members 206 from FIG. 2. Further, process 1900 may be implemented using system 103, which includes consolidation setup 104 that includes stackup 112, as described in FIG. 1-2.

Process 1900 begins by connecting first induction coils embedded in the inner tooling of a consolidation setup with second induction coils embedded in the outer tooling of the consolidation setup (operation 1902). Operation 1902 may be performed using connector devices such as connector devices 107 in FIG. 1. In one or more illustrative examples, the first induction coils and the second induction coils may be connected to ultimately form an annular-shaped solenoid coil.

Thereafter, a selected amount of pressure is applied to the bladder in the consolidation setup (operation 1904). For example, in operation 1904, a pressurization system may be connected to the bladder and may use inert gas to apply the pressure. In one illustrative example, the pressurization system pressurization tube located within the bladder or to a channel that extends through the bladder. The pressurization system may use inert gas to apply the pressure. In operation 1904, the amount of pressure applied may be small (e.g., about 15 psi).

The first induction coils and the second induction coils are energized to heat the first smart susceptor and the second smart susceptor in the consolidation setup and thereby heat the thermoplastic material in the consolidation setup to within selected tolerances of a selected temperature (operation 1906). The selected temperature may be, for example, a temperature above 350 degrees Fahrenheit. In operation 1906, the thermoplastic material may be the overbraided thermoplastic skin and the overbraided thermoplastic members of the stackup that will form the fuselage skin and fuselage stringers, respectively, of the composite fuselage structure.

Pressure is applied via the bladder and the stringer bladders (operation 1908). Operation 1908 may be performed by, for example, using the pressurization system to apply about pressure of about 250 psi to help smooth out the thermoplastic material. Operation 1908 is the step at which inductive consolidation of the overbraided thermoplastic skin to the overbraided thermoplastic members occurs and a composite fuselage structure is formed. This composite fuselage structure may be, for example, a fuselage barrel section. The temperature of the thermoplastic material is then reduced (operation 1910). The pressure is reduced when the temperature has reached below a selected threshold (operation 1912). For example, in operation 1912, the pressure may be reduced to about 15 psi once the temperature has dropped below about 300 degrees Fahrenheit.

Thereafter, the composite fuselage structure is unloaded (operation 1914). A vacuum is applied to the bladder to create a gap between the composite fuselage structure and the inner tooling of the consolidation setup (operation 1916). The outer tooling of the consolidation setup is removed, allowing the composite fuselage structure to be removed from the inner tooling (operation 1918), with the process terminating thereafter.

In other illustrative examples, process 1900 includes additional operations for customizing the composite fuselage structure once the composite fuselage structure has been removed from the inner tooling. For example, cutouts may be added to the composite fuselage structure and other components may be added to the composite fuselage structure. In one illustrative example, window belt cutouts are added. In other examples, fuselage and window frames are added using induction joining or induction welding techniques. Induction joining or induction welding may also be used to add parts such as, for example, without limitation, shear ties, systems brackets, antenna reinforcements, service pan reinforcements, other types of parts, or a combination thereof, to the composite fuselage structure.

Figure 20:
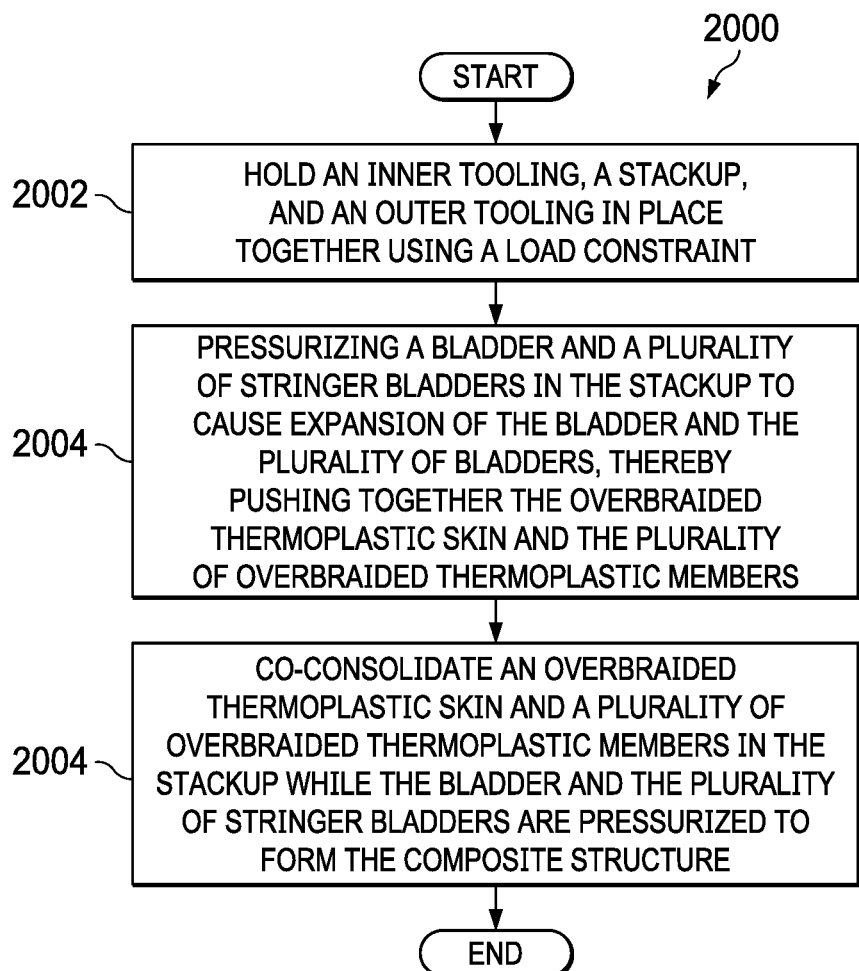
FIG. 20 is a flowchart of a process for forming a composite structure in accordance with an example embodiment.

FIG. 20 is a flowchart for forming a composite structure in accordance with an example embodiment. Process 2000 illustrated in FIG. 20 may be performed to form a composite structure such as composite structure 101 in FIG. 1.

Process 2000 begins by holding an inner tooling, a stackup, and an outer tooling in place together using a load constraint (operation 2002). A bladder and a plurality of stringer bladders in the stackup are pressurized to cause expansion of the bladder and the plurality of bladders, thereby pushing together the overbraided thermoplastic skin and the plurality of overbraided thermoplastic members (operation 2004).

Thereafter, an overbraided thermoplastic skin and a plurality of overbraided thermoplastic members are co-consolidated in the stackup while the bladder and the plurality of stringer bladders are pressurized to form the composite structure (operation 2006), with the process terminating thereafter. The pressurization provided in operation 2004 ensures that co-consolidation of the overbraided thermoplastic skin and the plurality of overbraided thermoplastic members occurs evenly and smoothly.

Figure 21:
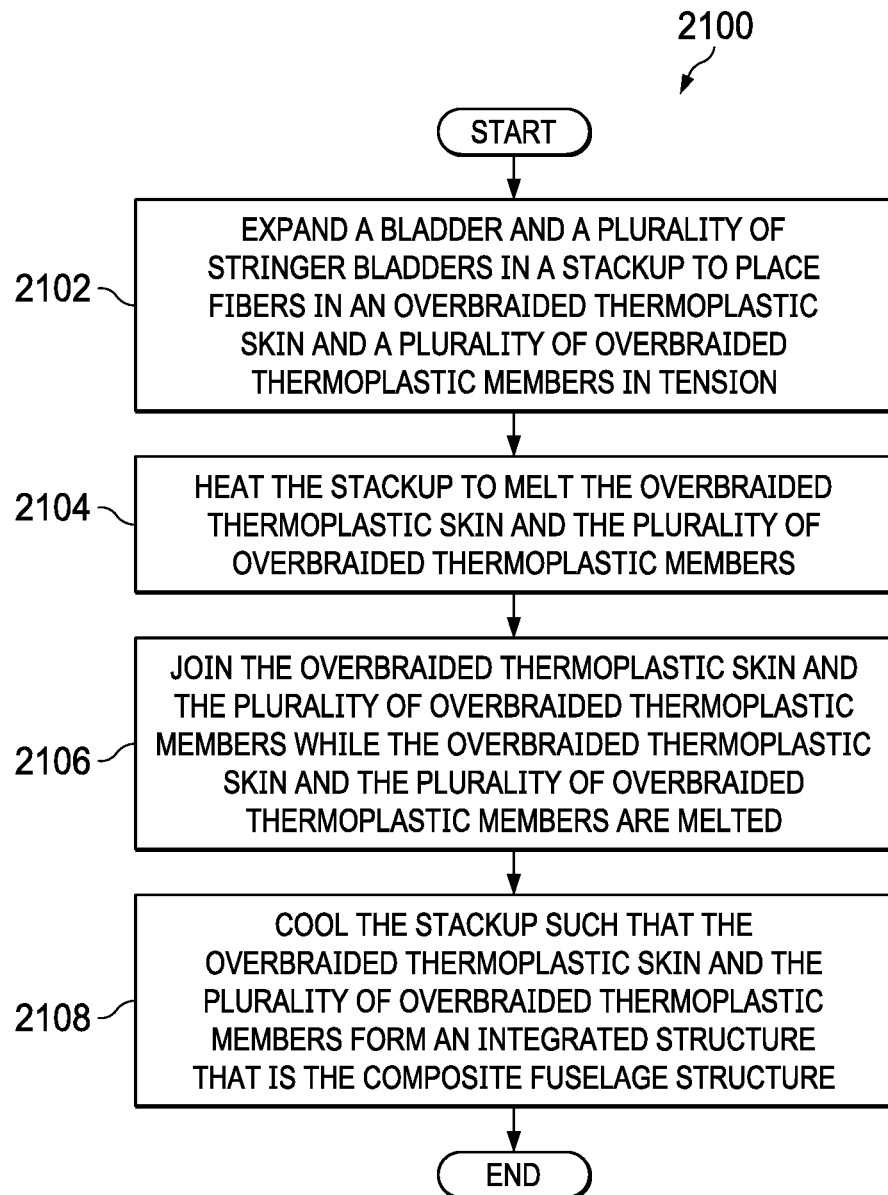
FIG. 21 is a flowchart of a process for forming a composite fuselage structure in accordance with an example embodiment.

FIG. 21 is a flowchart for forming a composite fuselage structure in accordance with an example embodiment. Process 2100 illustrated in FIG. 21 may be performed to form a composite structure such as composite structure 101 in FIG. 1.

Process 2100 begins by expanding a bladder and a plurality of stringer bladders in a stackup to place fibers in an overbraided thermoplastic skin and a plurality of overbraided thermoplastic members in tension (operation 2102). Operation 2102 may be performed by, for example, pressurizing the bladder and the plurality of stringer bladders. In some examples, the bladder and the stringer bladders are pressurized using pressurization tubes through which inert gas flows. The pressurization tubes may be expanded via the addition of inert gas, which may lead to expansion of the bladder and stringer bladders.

The stackup is heated to melt the overbraided thermoplastic skin and the plurality of overbraided thermoplastic members (operation 2104). Operation 2104 may be performed using induction-based smart susceptor heating. The overbraided thermoplastic skin and the plurality of overbraided thermoplastic members are then joined together while the overbraided thermoplastic skin and the plurality of overbraided thermoplastic members are melted (operation 2106). The stackup is cooled such that the overbraided thermoplastic skin and the plurality of overbraided thermoplastic members form an integrated structure that is the composite fuselage structure (operation 2108), with the process terminating thereafter.

Figure 22:
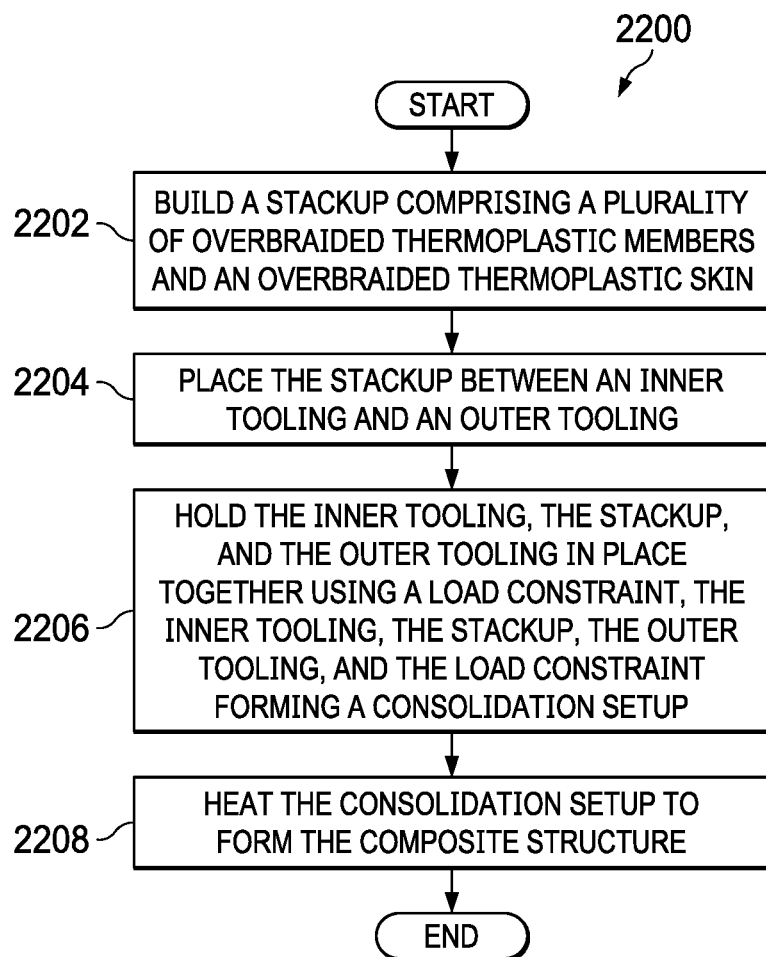
FIG. 22 is a flowchart of a process for forming a composite structure in accordance with an example embodiment.

FIG. 22 is a flowchart for forming a composite structure in accordance with an example embodiment. Process 2200 illustrated in FIG. 22 may be performed to form a composite structure such as composite structure 101 in FIG. 1.

Process 2200 begins by building a stackup comprising a plurality of overbraided thermoplastic members and an overbraided thermoplastic skin (operation 2202). The stackup is placed between an inner tooling and an outer tooling (operation 2204). The inner tooling, the stackup, and the outer tooling are held in place together using a load constraint, with the inner tooling, the stackup, the outer tooling, and the load constraint forming a consolidation setup (operation 2206). The consolidation setup is heated to form the composite structure (operation 2208), with the process terminating thereafter.

Figure 23:
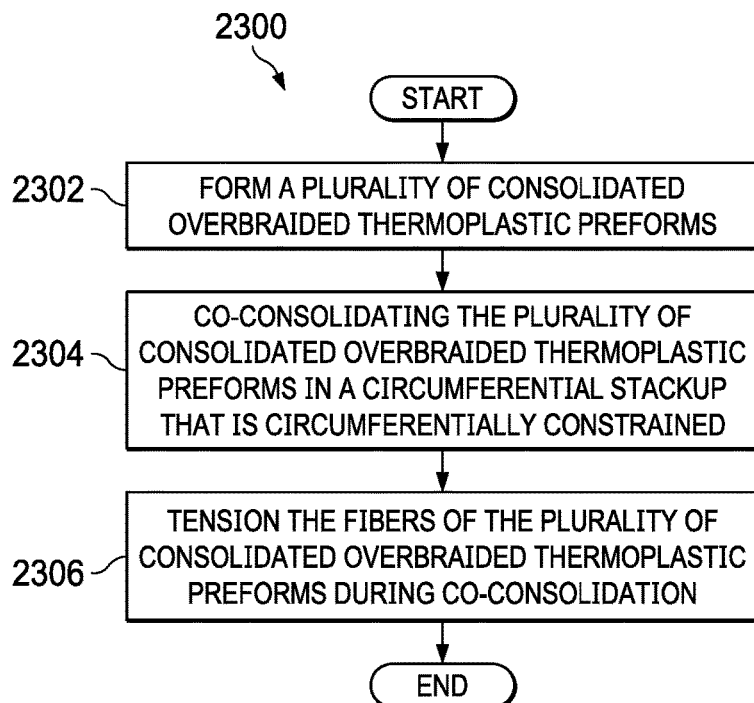
FIG. 23 is a flowchart of a process for forming a composite structure in accordance with an example embodiment.

FIG. 23 is an illustration of a process for forming a composite structure in accordance with an example embodiment. Process 2300 illustrated in FIG. 23 may be performed to form a composite structure such as composite structure 101 in FIG. 1.

Process 2300 may include forming a plurality of consolidated overbraided thermoplastic preforms (operation 2302). The plurality of consolidated overbraided thermoplastic preforms may include a plurality of overbraided thermoplastic members and an overbraided thermoplastic skin. Further, process 2300 includes co-consolidating the plurality of consolidated overbraided thermoplastic preforms in a circumferential stackup that is circumferentially constrained (operation 2304). The fibers of the plurality of consolidated overbraided thermoplastic preforms are tensioned during co-consolidation (operation 2306).

In process 2300, operation 2304 is performed without the use of an autoclave. In operation 2304, bladders are used to react against the outer load constraint and provide the pressure that would have typically been provided using an autoclave. Further, in operation 2304, induction coils and smart susceptors are used to provide the heat that would have typically been provided using an autoclave.

Figure 24:
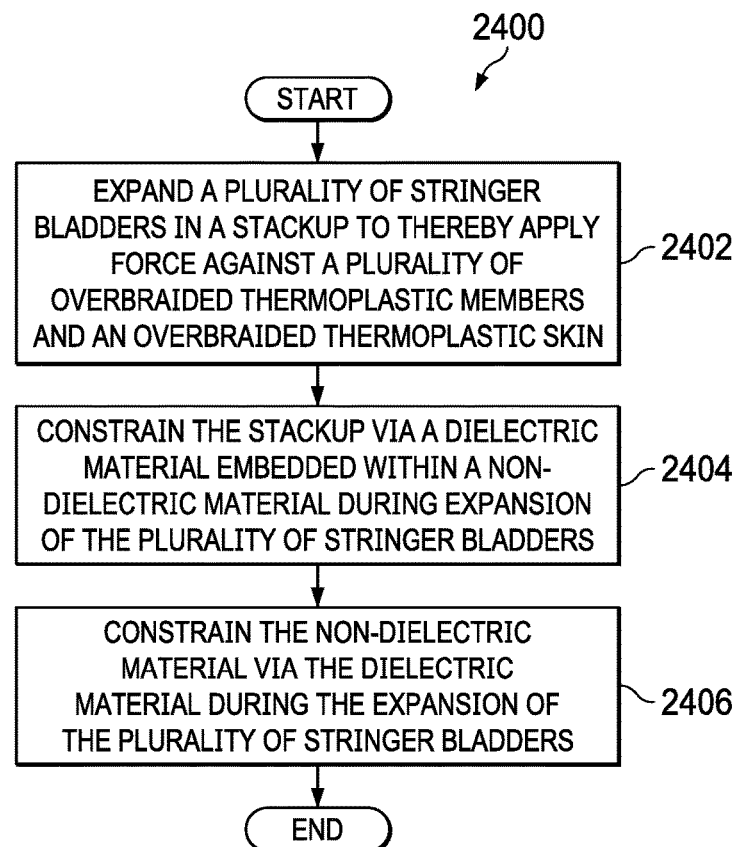
FIG. 24 is a flowchart of a process for forming a composite structure in accordance with an example embodiment.

FIG. 24 is an illustration of a process for forming a composite structure in accordance with an example embodiment. Process 2400 illustrated in FIG. 24 may be performed to form a composite structure such as composite structure 101 in FIG. 1.

Process 2400 begins by expanding a plurality of stringer bladders in a stackup to thereby apply force against a plurality of overbraided thermoplastic members and an overbraided thermoplastic skin (operation 2402). Operation 2402 may be performed by heating the plurality of stringer bladders and pressurizing the plurality of stringer bladders via an inert gas that flows from a plurality of pressurization tubes into the plurality of stringer bladders. The expansion of the plurality of stringer bladders tensions the plurality of overbraided thermoplastic members and helps resist compressive loading on the plurality of overbraided thermoplastic members.

The stackup is constrained via a dielectric material embedded within a non-dielectric material during expansion of the plurality stringer bladders (operation 2404). Operation 2404 may be performed by compressing the stackup against an outer tooling comprising the dielectric material. The dielectric material is a ceramic material and the non-dielectric material may be a plurality of induction coils used for the heating performed in operation 2402. The non-dielectric material is constrained via the dielectric material during the expansion of the plurality of stringer bladders (operation 2406).

Figure 25:
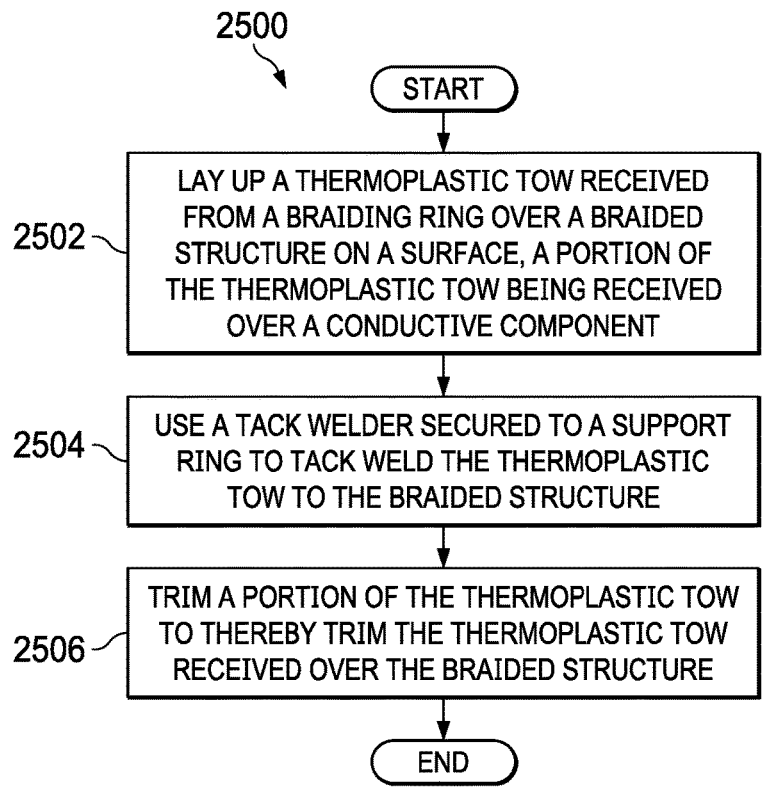
FIG. 25 is a flowchart of a process for tacking and trimming a thermoplastic tow in accordance with an example embodiment.

FIG. 25 is a flowchart of a process for tacking and trimming a thermoplastic tow in accordance with an example embodiment. The process illustrated in FIG. 25 may be used to tack and trim the thermoplastic tows that ultimately form overbraided thermoplastic skin 210 and overbraided thermoplastic members 206 in FIG. 2.

Process 2500 begins by laying up a thermoplastic tow received from a braiding ring over a braided structure on a surface, a portion of the thermoplastic tow being received over a conductive component (operation 2502). The thermoplastic tow may be an overbraided thermoplastic tow. The surface may be formed by at least one of a tooling surface, a caul, a bladder, a stringer bladder, a partially-formed braided layup, a preform, an integrated composite structure, or some other type of surface. The braided structure may be, for example, a braided layup of overbraided thermoplastic material, a partially-formed braided layup, a preform, an integrated structure made of overbraided thermoplastic material, or some other type of braided structure. In operation 2502, the thermoplastic tow may be positioned over the braided structure being formed on the surface. The conductive component in operation 2502 may be referred to as a "shoe."

A tack welder secured to a support ring is then used to tack weld the thermoplastic tow to the braided structure (operation 2504). In operation 2504, the tack welder is resistively heated to ensure even tacking of the thermoplastic tow to the braided structure. A portion of the thermoplastic tow is trimmed to thereby trim the thermoplastic tow received over the braided structure (operation 2506), with the process terminating thereafter. In operation 2506, laser energy is applied to the portion of the thermoplastic tow supported by a conductive component to trim the thermoplastic tow. The conductive component absorbs the laser energy to protect the braided structure below the conductive component.

Figure 26:
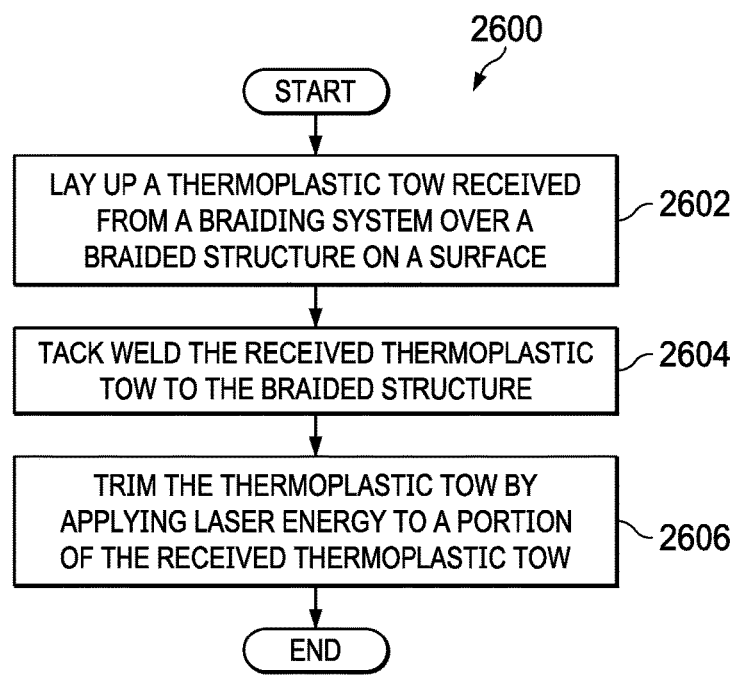
FIG. 26 is a flowchart of a process for tacking and trimming a thermoplastic tow in accordance with an example embodiment.

FIG. 26 is a flowchart of a process for tacking and trimming a thermoplastic tow in accordance with an example embodiment. The process illustrated in FIG. 26 may be used to tack and trim the thermoplastic tows that, ultimately form overbraided thermoplastic skin 210 and overbraided thermoplastic members 206 in FIG. 2.

Process 2600 begins by laying up a thermoplastic tow received from a braiding system over a braided structure on a surface (operation 2602). The received thermoplastic tow is tack welded to the braided structure (operation 2604). The thermoplastic tow is trimmed by applying laser energy to a portion of the received thermoplastic tow (operation 2606), with the process terminating thereafter.

Figure 27:
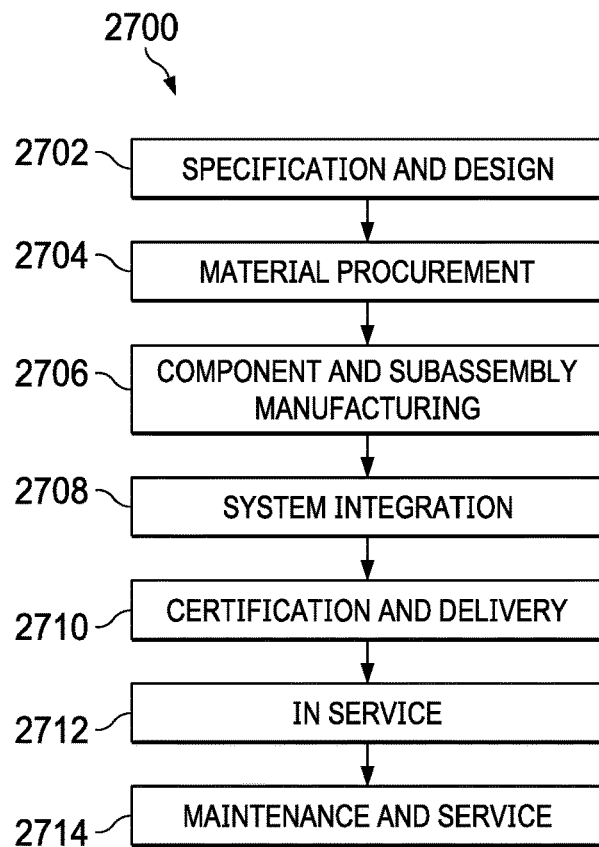
FIG. 27 is an illustration of an aircraft manufacturing and service method in accordance with an example embodiment.
Figure 28:
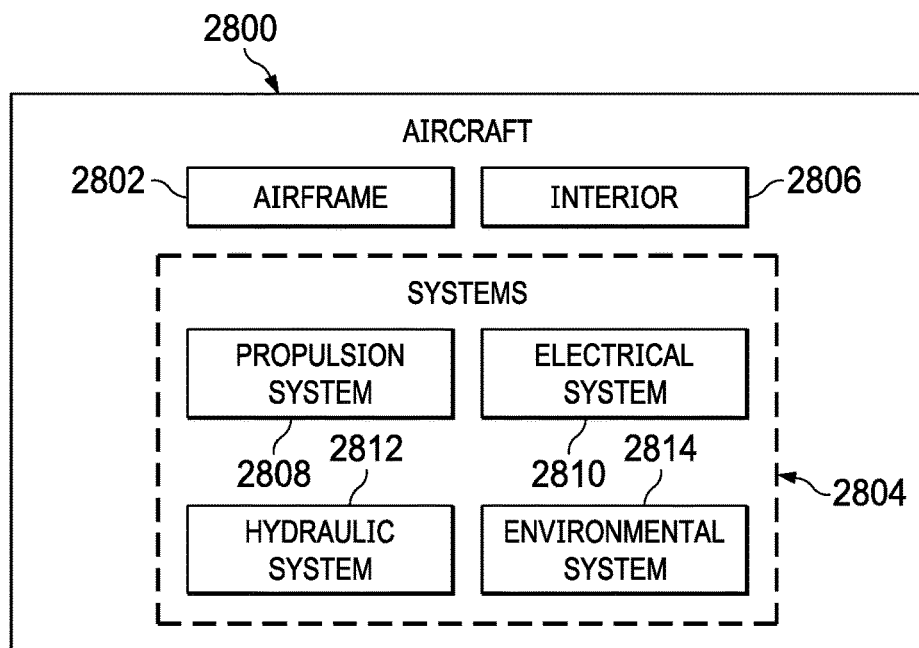
FIG. 28 is a block diagram of an aircraft in accordance with an example embodiment.

Example embodiments of the disclosure may be described in the context of aircraft manufacturing and service method 2700 as shown in FIG. 27 and aircraft 2800 as shown in FIG. 28. Turning first to FIG. 27, an illustration of an aircraft manufacturing and service method is depicted in accordance with an illustrative embodiment. During pre-production, aircraft manufacturing and service method 2700 may include specification and design 2702 of aircraft 2800 in FIG. 28 and material procurement 2704.

During production, component and subassembly manufacturing 2706 and system integration 2708 of aircraft 2800 in FIG. 28 takes place. Thereafter, aircraft 2800 in FIG. 28 may go through certification and delivery 2710 in order to be placed in service 2712. While in service 2712 by a customer, aircraft 2800 in FIG. 28 is scheduled for routine maintenance and service 2714, which may include modification, reconfiguration, refurbishment, and other maintenance or service.

Each of the processes of aircraft manufacturing and service method 2700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 28, an illustration of an aircraft is depicted in which an illustrative embodiment may be implemented. In this example, aircraft 2800 is produced by aircraft manufacturing and service method 2700 in FIG. 27 and may include airframe 2802 with plurality of systems 2804 and interior 2806. Examples of systems 2804 include one or more of propulsion system 2808, electrical system 2810, hydraulic system 2812, and environmental system 2814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2700 in FIG. 27. In particular, system 103 from FIGS. 1-2 may be used to form composite structure 101 during any one of the stages of aircraft manufacturing and service method 2700. For example, without limitation, system 103 from FIGS. 1-2 may be used to form composite structure 101 during at least one of component and subassembly manufacturing 2706, system integration 2708, routine maintenance and service 2714, or some other stage of aircraft manufacturing and service method 2700. Still further, system 103 from FIGS. 1-2 may be used to form at least a portion of airframe 2802 of aircraft 2800 in FIG. 28. For example, system 103 may be used to form a fuselage barrel section of airframe 2802.

In one illustrative example, components or subassemblies produced in component and subassembly manufacturing 2706 in FIG. 27 may be fabricated or manufactured in a manner similar to components or subassemblies produced while aircraft 2800 is in service 2712 in FIG. 27. As yet another example, one or more apparatus embodiments, method embodiments, or a combination thereof may be utilized during production stages, such as component and subassembly manufacturing 2706 and system integration 2708 in FIG. 27. One or more apparatus embodiments, method embodiments, or a combination thereof may be utilized while aircraft 2800 is in service 2712 and/or during maintenance and service 2714 in FIG. 27. The use of a number of the different illustrative embodiments may substantially expedite the assembly of and/or reduce the cost of aircraft 2800.

The flowcharts and block diagrams in the different depicted embodiments illustrate the architecture, functionality, and operation of some possible implementations of apparatuses and methods in an example embodiment. In this regard, each block in the flowcharts or block diagrams may represent a module, a segment, a function, and/or a portion of an operation or step.

In some alternative implementations of an example embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required. For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and ten of item C; four of item B and seven of item C; or some other suitable combination.

The description of the different example embodiments has been presented for purposes of illustration and description, and is not intended to be exhaustive or limited to the embodiments in the form disclosed. Many modifications and variations will be apparent to those of ordinary skill in the art. Further, different example embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for forming a composite structure, the method comprising:
   obtaining a stackup comprising a thermoplastic skin positioned over a plurality of stringer bladders and a plurality of overbraided thermoplastic members such that each of the plurality of stringer bladders is sandwiched between the overbraided thermoplastic skin and a corresponding one of the plurality of overbraided thermoplastic members;
   expanding the plurality of stringer bladders in the stackup to thereby apply force against the plurality of overbraided thermoplastic members and the overbraided thermoplastic skin;
   constraining the stackup via a dielectric material embedded within a non-dielectric material during expansion of the plurality of stringer bladders; and
   constraining the non-dielectric material via the dielectric material during expansion of the plurality of stringer bladders.

2. The method of claim 1 further comprising:
   building the stackup comprising a bladder comprising a plurality of recessed portions and a plurality of cauls, each of the recessed portions being located between two of the cauls, each of the plurality of stringer bladders being nested within a corresponding one of the recessed portions, the plurality of overbraided thermoplastic members being positioned between the plurality of stringer bladders and the bladder; and
   positioning the stackup between an inner tooling and an outer tooling that each includes the dielectric material and the non-dielectric material.

3. The method of claim 1, wherein causing the plurality of stringer bladders in the stackup to expand comprises:
   heating the plurality of stringer bladders.

4. The method of claim 1, wherein causing the plurality of stringer bladders in the stackup to expand comprises:
   pressurizing the plurality of stringer bladders via an inert gas that flows from a plurality of pressurization tubes into the plurality of stringer bladders, wherein the plurality of pressurization tubes pass through the plurality of stringer bladders.

5. The method of claim 1, wherein constraining the stackup comprises:
   compressing the stackup against an outer tooling comprising the dielectric material, wherein the dielectric material is a ceramic material and the non-dielectric material embedded within the dielectric material is a plurality of induction coils.

6. The method of claim 1, wherein causing the plurality of stringer bladders in the stackup to expand comprises:
   expanding the plurality of stringer bladders to tension the plurality of overbraided thermoplastic members via the expansion.

7. The method of claim 1, wherein causing the plurality of stringer bladders in the stackup to expand comprises:
   resisting compressive loading on the plurality of overbraided thermoplastic members by expansion of the plurality of stringer bladders.

8. A portion of an aircraft composite barrel section assembled according to the method of claim 1.

9. The method of claim 1, wherein the method is performed by a system comprising:
   an inner tooling;
   a first smart susceptor positioned around the inner tooling;
   the stackup positioned around the first smart susceptor, the stackup further comprising:
      a bladder having a plurality of recessed portions; and
      a plurality of cauls positioned within the plurality of recessed portions;
      wherein the plurality of overbraided thermoplastic members are positioned over the plurality of cauls;
      wherein the plurality of stringer bladders are positioned in contact with the plurality of overbraided thermoplastic members; and
   wherein the system further comprises:

a second smart susceptor positioned around the stackup; and an outer tooling positioned around the second smart susceptor.

10. The method of claim 9, further comprising:

capping a first end and a second end of the stackup with a plurality of caps.

11. The method of claim 10, wherein the inner tooling is embedded with first induction coils and the outer tooling is embedded with second induction coils connected to the first induction coils by a plurality of connector devices.

12. The method of claim 10, the system further comprising:

an end tooling for locating and securing the plurality of plugs.

13. The method of claim 1, further comprising:

consolidating the overbraided thermoplastic members to the overbraided thermoplastic skin when the plurality of stringer bladders is expanded.

14. The method of claim 1, wherein:

obtaining the stackup comprises obtaining a plurality of overbraided thermoplastic preforms, wherein the stackup is a circumferential stackup, and the plurality of overbraided thermoplastic preforms are the plurality of overbraided thermoplastic members; and the method further comprises:

co-consolidating the plurality of consolidated overbraided thermoplastic preforms in the circumferential stackup that is circumferentially constrained; and tensioning fibers of the plurality of consolidated overbraided thermoplastic preforms during co-consolidation.

15. The method of claim 14, wherein co-consolidating the plurality of consolidated overbraided thermoplastic preforms comprises:

heating the circumferential stackup to co-consolidate the plurality of consolidated overbraided thermoplastic preforms.

16. The method of claim 15, wherein heating the circumferential stackup comprises:

heating, inductively, the circumferential stackup to co-consolidate the plurality of consolidated overbraided thermoplastic preforms.

17. The method of claim 14, wherein co-consolidating the plurality of consolidated overbraided thermoplastic preforms comprises:

heating the circumferential stackup using a plurality of induction coils and a plurality of smart susceptors to co-consolidate the plurality of consolidated overbraided thermoplastic preforms.

18. The method of claim 14, wherein co-consolidating the plurality of consolidated overbraided thermoplastic preforms comprises:

expanding the plurality of stringer bladders and a bladder in the circumferential stackup to thereby apply force against the plurality of consolidated overbraided thermoplastic preforms.

19. The method of claim 18, wherein expanding the plurality of stringer bladders and the bladder comprises:

pressurizing the plurality of stringer bladders and the bladder in the circumferential stackup using an inert gas.

20. A portion of an aircraft composite barrel section assembled according to the method of claim 14.

21. The method of claim 1, wherein the plurality of stringer bladders are spaced from each other.

22. The method of claim 1, wherein each of the plurality of overbraided thermoplastic members has a portion positioned between adjacent stringer bladders.

23. The method of claim 1, wherein the thermoplastic skin contacts flanged portions of each of the plurality of overbraided thermoplastic members on at least two sides of the corresponding one of the plurality of stringer bladders.

24. The method of claim 1, wherein each of the plurality of overbraided thermoplastic members has a first portion underlying the corresponding one of the plurality of stringer bladders and has second portions extending from the first portion toward the thermoplastic skin along at least two opposite sides of the corresponding one of the plurality of stringer bladders.

25. The method of claim 1, further comprising joining each of the plurality of overbraided thermoplastic members to the thermoplastic skin on at least two opposite sides of the corresponding one of the plurality of stringer bladders.

26. The method of claim 25, further comprising melting the thermoplastic skin and the plurality of overbraided thermoplastic members;

wherein the joining of the plurality of overbraided thermoplastic members to the thermoplastic skin is performed while the plurality of overbraided thermoplastic members and the thermoplastic skin are melted.

* * * * *